US007965729B2

(12) United States Patent
Veeraraghavan et al.

(10) Patent No.: US 7,965,729 B2
(45) Date of Patent: Jun. 21, 2011

(54) TRANSFERRING DATA SUCH AS FILES

(75) Inventors: Malathi Veeraraghavan, Atlantic Highlands, NJ (US); Timothy Christopher Moors, Dalkeith, WA (US)

(73) Assignee: Polytechnic University, Brooklyn, NY (US)

( * ) Notice: Subject to any disclaimer, the term of this patent is extended or adjusted under 35 U.S.C. 154(b) by 2073 days.

(21) Appl. No.: 10/155,832

(22) Filed: May 23, 2002

(65) Prior Publication Data

US 2003/0053475 A1 Mar. 20, 2003

Related U.S. Application Data

(60) Provisional application No. 60/293,028, filed on May 23, 2001.

(51) Int. Cl.
H04L 12/54 (2006.01)
(52) U.S. Cl. .................. 370/428; 370/473; 370/477
(58) Field of Classification Search .............. 370/474, 370/395.21, 395.43, 395.63, 409, 428, 473, 370/477, 395, 351, 329, 410, 314, 130, 349, 370/344; 709/224, 237; 714/749
See application file for complete search history.

(56) References Cited

U.S. PATENT DOCUMENTS

| | | | | |
|---|---|---|---|---|
| 4,375,097 A * | 2/1983 | Ulug | .......................... | 370/400 |
| 5,181,199 A * | 1/1993 | Motoki et al. | .................. | 370/426 |
| 5,394,398 A * | 2/1995 | Rau | ............................. | 370/394 |
| 5,487,072 A * | 1/1996 | Kant | ............................. | 714/748 |
| 5,490,251 A * | 2/1996 | Clark et al. | .................... | 709/237 |
| 5,535,221 A * | 7/1996 | Hijikata et al. | ............... | 714/708 |
| 5,563,939 A * | 10/1996 | La Porta et al. | ........... | 379/221.02 |
| 5,610,904 A * | 3/1997 | Eng et al. | ....................... | 370/408 |
| 5,668,812 A * | 9/1997 | Akiyoshi | ........................ | 370/474 |
| 5,818,852 A * | 10/1998 | Kapoor | .......................... | 714/749 |
| 6,016,319 A * | 1/2000 | Kshirsagar et al. | ............. | 370/410 |
| 6,151,319 A * | 11/2000 | Dommety et al. | .......... | 370/395.52 |
| 6,198,752 B1 * | 3/2001 | Lee | ............................. | 370/395.65 |

(Continued)

FOREIGN PATENT DOCUMENTS

GB 2254529 * 10/1992

OTHER PUBLICATIONS

Banks et al. (Frame Relaying Service opportunity, Private Switching Systems and Networks, 1988. International Conference on Jun. 21-23, 1988 pp. 105-110).*

(Continued)

Primary Examiner — Salman Ahmed
(74) Attorney, Agent, or Firm — Woodcock Washburn LLP

(57) ABSTRACT

Transferring data (such as files) on an end-to-end, high-speed packet-switched network connection (a "virtual circuit") or on a circuit. An out-of-band path is used for signaling and status messages (control). The same, or a separate, out-of-band path may be used to retransmit chunks of data that were received with errors or that were not received at all. By simplifying the data being sent over the high-speed (virtual) circuit, the resources of the (virtual) circuit are used efficiently since less overhead is required. Further, since the size of the file to be transferred can be predetermined, and since any retransmissions can be made over a path other than the (virtual) circuit, the (virtual) circuit that best meets the needs of the data transfer can be selected, thereby further increasing the efficiency with which the (virtual) circuit is used.

26 Claims, 7 Drawing Sheets

U.S. PATENT DOCUMENTS

| | | | | |
|---|---|---|---|---|
| 6,483,853 B1* | 11/2002 | Kshirsagar et al. | | 370/466 |
| 6,496,481 B1* | 12/2002 | Wu et al. | | 370/242 |
| 6,516,000 B1* | 2/2003 | Kshirsagar et al. | | 370/410 |
| 6,522,635 B1* | 2/2003 | Bedwell | | 370/314 |
| 6,549,533 B1* | 4/2003 | Campbell | | 370/351 |
| 6,603,796 B1* | 8/2003 | Kondo | | 375/130 |
| 6,802,064 B1* | 10/2004 | Yao et al. | | 718/102 |
| 6,870,874 B2* | 3/2005 | Izumi | | 375/132 |
| 7,230,940 B2* | 6/2007 | Fantaske | | 370/338 |
| 7,457,274 B2* | 11/2008 | Fantaske | | 370/338 |
| 7,876,725 B2* | 1/2011 | Fantaske | | 370/328 |
| 2001/0023438 A1* | 9/2001 | Ishida | | 709/224 |
| 2001/0047421 A1* | 11/2001 | Sridhar et al. | | 709/230 |
| 2002/0064167 A1* | 5/2002 | Khan et al. | | 370/410 |
| 2002/0165014 A1* | 11/2002 | Rai | | 455/567 |
| 2004/0120322 A1* | 6/2004 | Wu | | 370/395.4 |
| 2004/0190471 A1* | 9/2004 | Bender et al. | | 370/329 |
| 2005/0027859 A1* | 2/2005 | Alvisi et al. | | 709/224 |
| 2005/0237994 A1* | 10/2005 | Fong et al. | | 370/349 |
| 2007/0002818 A1* | 1/2007 | Steer et al. | | 370/344 |

OTHER PUBLICATIONS

Intel Local Network Architecture; Ryan, R.; Marshall, G.D.; Beach, R.; Kerman, S.R.; Micro, IEEE vol. 1, Issue: 4 Digital Object Identifier: 10.1109/MM.1981.290892 Publication Year: 1981.*

Performance Analysis of Two Multichannel Fast Retransmission Schemes for Delay-Sensitive Flows; YL Chung—Vehicular Technology, IEEE Transactions 2010.*

* cited by examiner

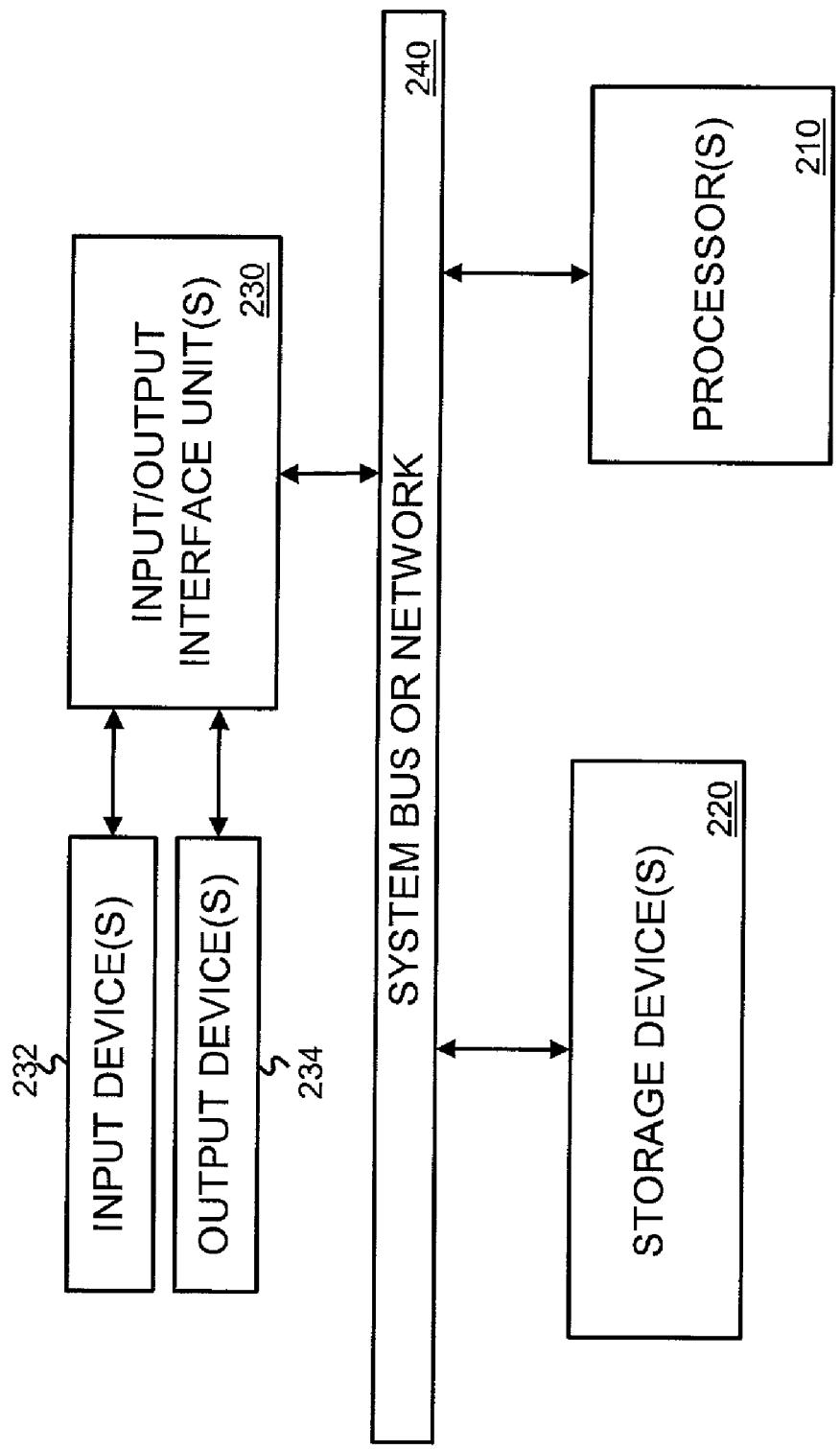

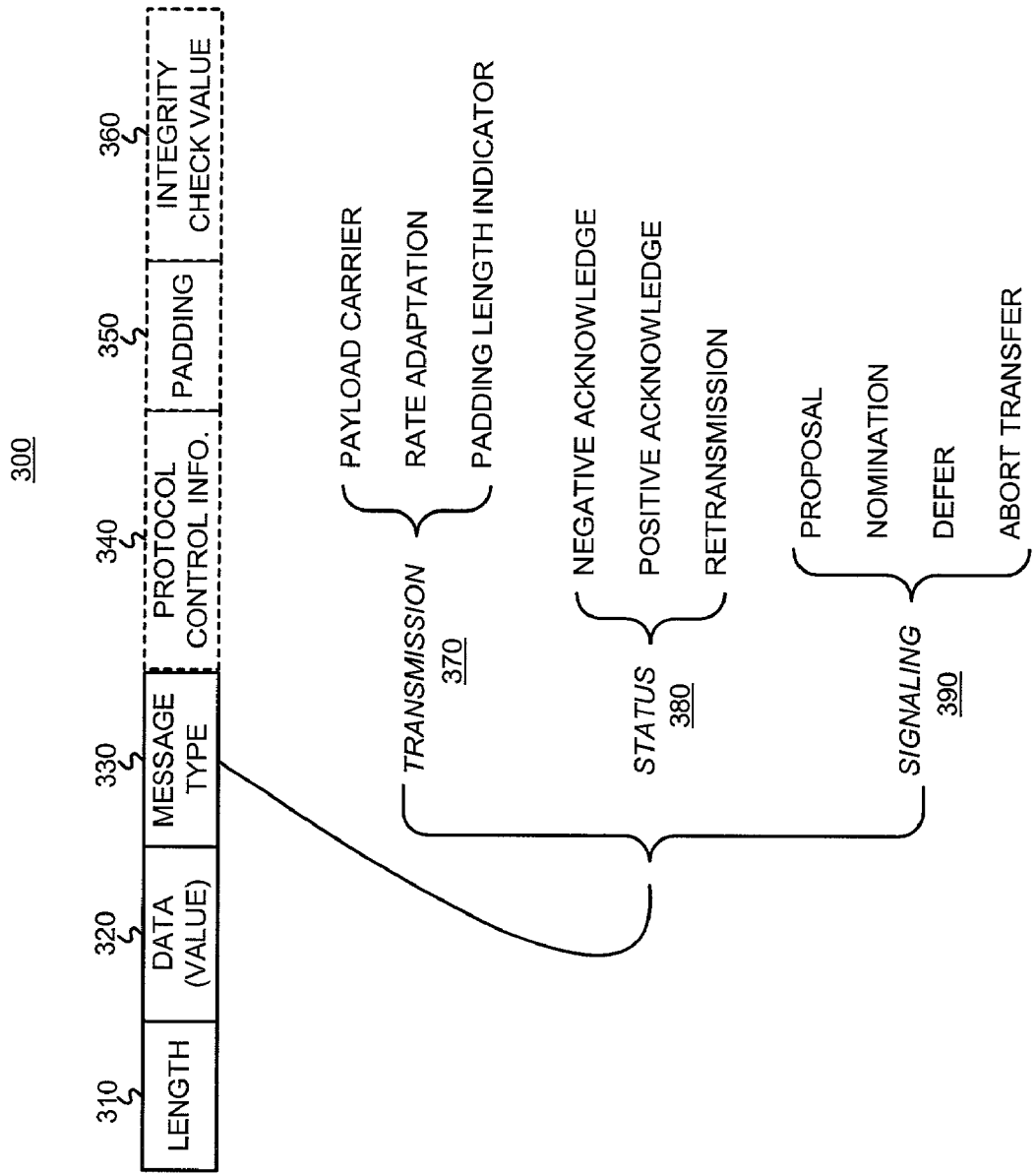

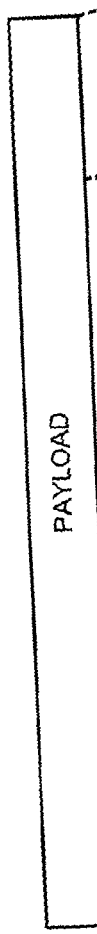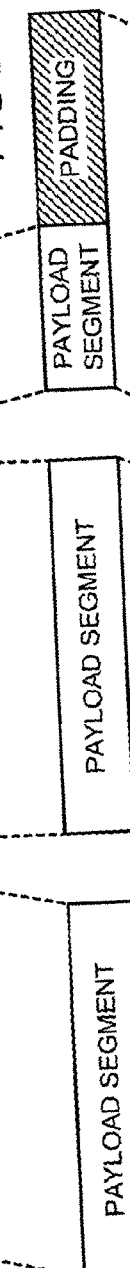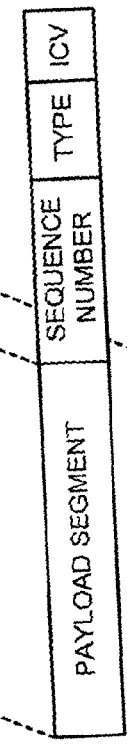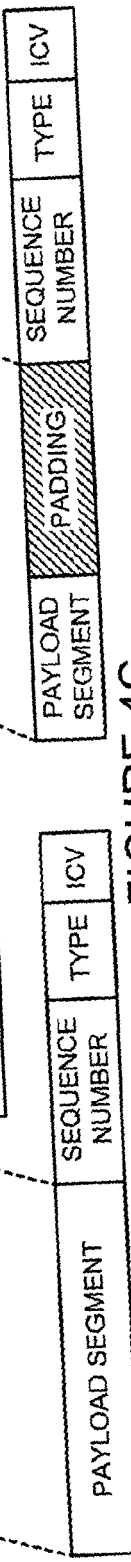
FIGURE 4A
FIGURE 4B
FIGURE 4C

TRANSFERRING DATA SUCH AS FILES

§0. RELATED APPLICATIONS

Benefit is claimed, under 35 U.S.C. §119(e)(1), to the filing date of provisional patent application Ser. No. 60/293,028, entitled "PRELIMINARY SPECIFICATION AND EXPLANATION OF A DATA TRANSFER TECHNIQUE OF THE PRESENT INVENTION: AN END-TO-END PROTOCOL FOR TRANSPORTING BULK DATE OVER (VIRTUAL) CIRCUITS", filed on May 23, 2001 and listing Tim Moors and Malathi Veeraraghavan as the inventors, for any inventions disclosed in the manner provided by 35 U.S.C. §112, ¶1. This provisional application is expressly incorporated herein by reference. However, the invention is not intended to be limited by any statements in that provisional application. Rather, that provisional application should be considered to describe exemplary embodiments of the invention.

§1. BACKGROUND OF THE INVENTION

§1.1 Field of the Invention

The present invention concerns data communications. More specifically, the present invention concerns the (high-speed) transfer of bulk data, such as files for example.

§1.2 Description of Related Art

The description of art in this section is not, and should not be interpreted to be, an admission that such art is prior art to the present invention. Circuit-switched and packet-switched networks are introduced in §1.2.1. The special characteristics of bulk data transfers are introduced in §1.2.2. Drawbacks of known ways of effecting bulk data transfers are introduced in §1.2.3. Finally, needs unmet by known bulk data transfer techniques are listed in §1.2.4.

§1.2.1 Circuit-switched Networks and Packet-switched Networks

Circuit-switched networks establish a connection between hosts (parties to a communication) for the duration of their communication ("call"). The public switched telephone network ("PSTN") is an example of a circuit-switched network, where parties to a call are provided with a connection for the duration of the call. Hence, circuit-switched networks are said to be "connection-oriented". Unfortunately, for many communications applications, circuit-switched networks use network resources inefficiently. Consider for example, the communications of short, infrequent "bursts" of data between hosts. Providing a connection for the duration of a call between such hosts simply wastes communications resources when no data is being transferred. Such inefficiencies have lead to "connectionless" packet-switched networks.

Packet-switched networks traditionally forward addressed data (referred to as "packets" in the specification below without loss of generality), typically on a best efforts basis, from a source to a destination. Many large packet-switched networks are made up of interconnected nodes (referred to as "routers" in the specification below without loss of generality). The routers may be geographically distributed throughout a region and connected by links (e.g., optical fiber, copper cable, wireless transmission channels, etc.). In such a network, each router typically interfaces with (e.g., terminates) multiple links.

Packets traverse the network by being forwarded from router to router until they reach their destination (as typically specified by so-called layer-3 addresses in the packet headers). Unlike switches, which establish a connection for the duration of a "call" to send data received on a given input port out on a given output port, routers determine the destination addresses of received packets and, based on these destination addresses, determine, in each case, the appropriate link on which to send them. Hence, such networks are said to be "connectionless". Routers may use protocols to discover the topology of the network, and algorithms to determine the most efficient ways to forward packets towards a particular destination address(es). Since the network topology can change (e.g., if a link, interface, or router fails), packets destined for the same address may be routed differently. Such packets can even arrive out of sequence.

Although circuit-switching was common in early telephone networks, it fell from favor with the advent of packet-switched data networks. However, it is now experiencing a resurgence with all-optical networking, since the processing and buffering functions required for packet switching are expensive in the optical domain. All-optical networks promise higher bandwidths than are available in electro-optical networks. For example, a Dense Wavelength Division Multiplexed ("DWDM") fiber may carry multiple channels each providing a throughput of 10 Gb/s or higher. Unlike packet-switched networks that can support a continuous range of rates (e.g. all rates from 0 to 100 Mb/s for Fast Ethernet), circuit-switched networks often only support a discrete set of rates. For example, a pure SONET interface may offer circuits in rates that are integer multiples of the base circuit rate, e.g. 51.84 Mb/s. Another example is DWDM systems, whose discrete offering is a wavelength, which may provide a rate of the order of 1 or 10 Gb/s.

§1.2.2 Characteristics of Bulk Data Transfers, such as File Transfers

Bulk transfers, such as file transfers for example, typically require high reliability, but are much less sensitive to delay (e.g., latency) and delay variations (e.g., jitter) than other types of data. More specifically, file transfers are generally relatively insensitive to delays, as compared to "real-time" data such as voice and video which have stricter delay requirements (e.g. 400 ms for voice). The actual delay requirement for a file transfer depends on the context of the file transfer. For example, an application for transferring a backup may be able to tolerate a delay of hours, whereas the transfer of a file that a person is waiting for may have an acceptable delay of minutes before the user tries an alternative method.

File transfers generally require high "reliability". Some have expressed six "types" of reliability—namely integrity, completeness, delivery, relevance, sequence and uniqueness. The integrity aspect of reliability pertains to ensuring that data received has the same value as that transmitted. The completeness aspect of reliability pertains to ensuring that everything that was transmitted arrives at the destination. The delivery aspect of reliability pertains to informing the data source (the transmitter) that all information has been delivered. The relevance aspect of reliability pertains to ensuring that only what was transmitted by the source (transmitter) arrives at the sink (receiver) (e.g., no extraneous information should be inserted). The sequence aspect of reliability pertains to ensuring that information arrives in the proper sequence. The uniqueness aspect of reliability pertains to ensuring that information is not duplicated.

File transfers generally require high degrees of all six aspects of reliability. For example, the Switched Multimegabit Data Service ("SMDS") specifies that, regarding integrity, less than 5 in $10^{13}$ packets delivered should include errors, regarding completeness, less than 1 in $10^4$ packets should fail to be delivered, regarding relevance, less than 5 in $10^8$ packets should be mis-delivered, regarding sequence, less than 1 in $10^9$ packets should be allowed to be mis-sequenced, regarding uniqueness. SMDS also specifies the allowable duplicate-packet ratio. The fact that these figures relate to a data service suggests that they might be applicable to file transfers. Furthermore, since a file will generally consist of multiple SMDS packets (which carry up to 9188 bytes of payload), the requirements for complete files would likely be a couple of orders of magnitude more stringent.

§1.2.3 Known Ways of Effecting Bulk Data Transfers and their Perceived Shortcomings Some popular existing file transfer techniques use packet-switched networks for both control signaling and the actual transfer of the payload. Such techniques tend to be slow, have high associated overhead, and often need to re-sequence packets of data delivered out-of-order.

To enable packets to be re-sequenced, destinations tend to have re-sequencing buffers in which the destination stores packets while waiting to correctly receive preceding chunks. Such re-sequencing buffers are an added expense, and may need to be quite large for higher speed transfers.

Further, conventional transport layers may retransmit for error control. If so, the source transport layer will retain information until it has been acknowledged. Unfortunately, the size of this retransmission buffer increases with the bandwidth-delay product of the communication channel. For high-speed links, this buffer must be both large and fast, which leads to significant expense in hardware (e.g. large static RAMs), all for retransmissions that should, in practice, be rare. For example, for a 1 Gb/s channel with a round-trip propagation delay of 100 ms, the buffer must hold at least 0.1 Gb, i.e. 12.5 MB. The buffer will actually need to be larger than this in order to hold information that is not immediately acknowledged (e.g. not received properly by the destination, or the acknowledgement was lost), until a timeout occurs. The size of this enlargement depends on the probability of information not being immediately acknowledged, and the size of the timeouts.

§1.2.4 Unmet Needs

In view of the foregoing, there is a need for a better way to effect bulk data (e.g., file) transfers. Such transfers should be high-speed, yet not waste high-speed communications facilities. This is particularly true if these high-speed communications facilities are circuits switched networks, where bandwidth is reserved for the exclusive use of terminals that are connected to a (virtual) circuit, as opposed to packet-switched networks, in which unused bandwidth can be used by other terminals. Processing for effecting such transfers should be simple, and should use, or build upon, existing technologies when possible. Finally, such transfers should enable error detection and recovery.

§2. SUMMARY OF THE INVENTION

The present invention provides data (e.g., file) transfer techniques that are designed to be used with high-speed (virtual) circuits, and to use them efficiently. The data transfer techniques of the present invention preferably support upper-layer signaling over a separate, out-of-band (i.e., not over the (virtual) circuit used to transmit the data) network, such as a packet-switched network. In this way, the (virtual) circuit is not partially idle when it is first established. Moreover, the data transfer techniques of the present invention preferably release the (virtual) circuit immediately after the initial transmission is complete so that the (virtual) circuit is not partially idle when it is about to be released. Retransmissions used to recover from errors in the original transmission preferably take place over out-of-band (i.e., not over the (virtual) circuit used to transmit the data). Indeed, this separate out-of-band network may be the same out-of-band network used for signaling (e.g., a packet-switched network).

A data transfer technique of the present invention preferably avoids complicated processing of the bulk data, which could form a bottleneck and slow down the transfer.

The (virtual) circuits may be multi-gigabit per second optical lightpaths for example. Since the desire for high-speed occasionally conflicts with the desire for efficient (virtual) circuit use, the data transfer techniques of the present invention may allow the application that it services, to specify its type of service ("TOS") preference, which determines how this tradeoff should be made.

The data transfer techniques of the present invention may support high-speed operations by having a very simple critical path. In one embodiment, the chunks are of fixed size, except for the last, whose truncation indicates the end of the file. For example, in one embodiment, a destination terminal need only check that an incoming "chunk" (carrying a payload defined by a segment of the bulk data (file)) has the expected size and sequence number (size equal to its predecessor, and sequence number one larger than its predecessor's)—all other processing occurs off the critical path. This facilitates software implementations of the data transfer techniques of the present invention, since they would need only a few instructions to process chunks, increasing the rate at which a given processor can process payload. This also makes the data transfer techniques of the present invention amenable to hardware implementation, which has the potential to offer even higher speeds than software.

The present invention provides data transfer operations that match (i) the communication channel to the applications (e.g. reducing the error rate), (ii) the applications to the communication channel (e.g. accommodating the maximum transmission units permitted by the network, or avoiding congestion), and (iii) the communication aspects of the applications to each other (e.g. providing flow control).

§3. BRIEF DESCRIPTION OF THE DRAWINGS

FIG. 2 is a block diagram of exemplary apparatus that may be used to effect various aspects of the present invention.

FIG. 3 is an exemplary data structure that may be used to accommodate data transmission, signaling and control information in accordance with the present invention.

FIGS. 4A-4C illustrate how a payload (of data) can be segmented, and then how additional information can be applied to each of the segments to define chunks.

§4. DETAILED DESCRIPTION

Figure 1:
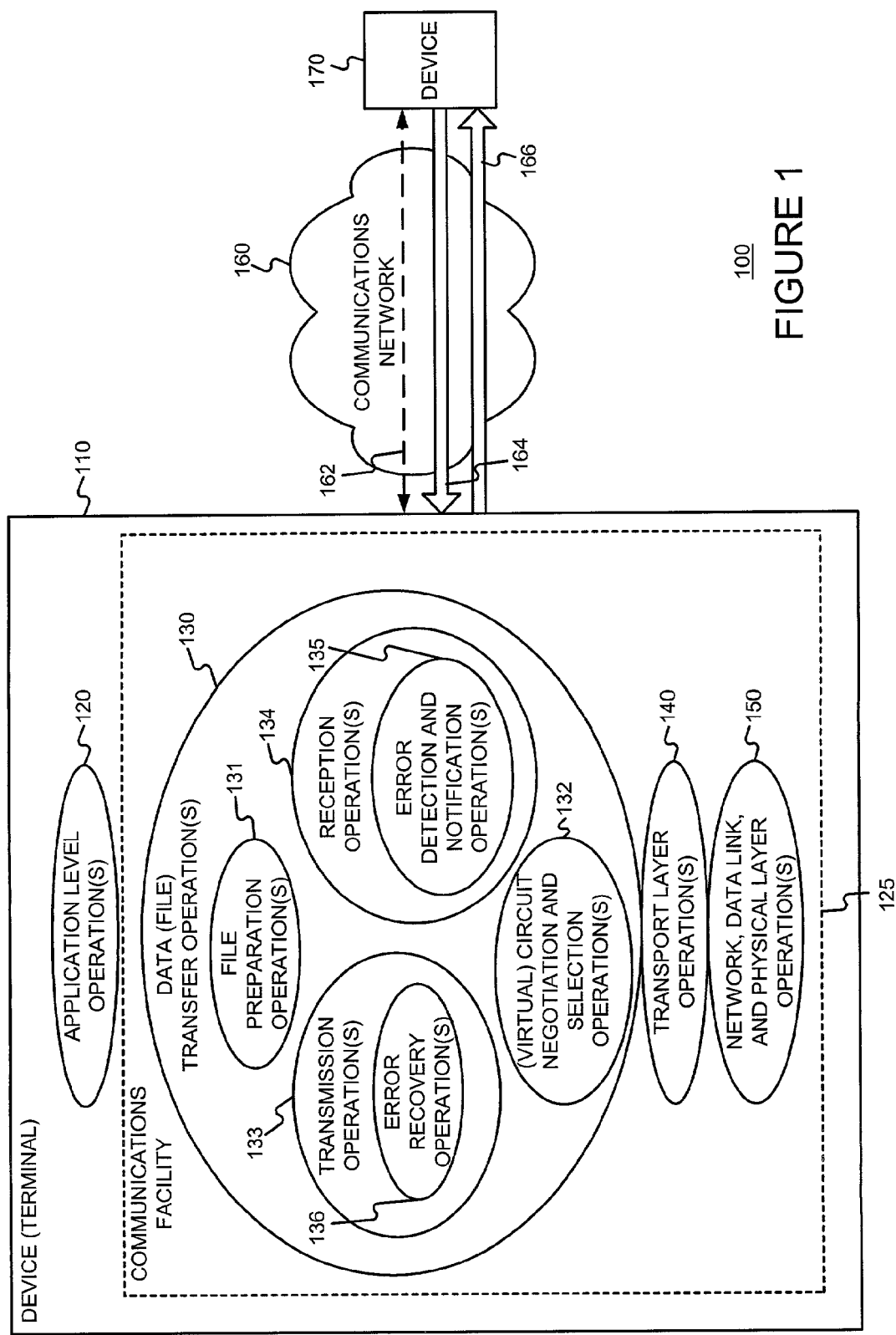
FIG. 1 is a bubble diagram illustrating operations that may be performed by a communications facility of a terminal, as well as various communications networks or means over which terminals can communicate.

The present invention involves methods, apparatus and data structures for providing high-speed, high-capacity data transfers. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications.

Thus, the present invention is not intended to be limited to the embodiments shown and the inventors regards their invention as the following disclosed methods, apparatus and data structures and any other patentable subject matter.

The following table provides the meaning of various symbols used in the description.

| Symbol | Meaning |
|---|---|
| C | maximum chunk length = S + H |
| D | padded payload length |
| E | bit error probability |
| H | overheads |
| P | payload length |
| R | rate of a link (bits per second) |
| S | maximum segment length |
| s | Sequence number size in bits |
| T | transmission length |
| U | "transmission unit" length |
| V | variability of delay from destination to source |

As used in the specification, the following terms should be broadly interpreted as follows:

Terminals: A data transfer technique of the present invention is designed to transport data from a "source" (or "transmitter") to a "destination" (or "receiver"). The source and destination are collectively referred to as "terminals". The bulk of the transfer flows from the source to the destination, and the (virtual) circuit that a data transfer technique of the present invention uses also flows in this direction, although a data transfer technique of the present invention may also carry smaller amounts of application information from the destination to the source (e.g. a destination that "pulls" information in a file-transfer may send to the source the name of the file to be transferred). Either the source or the destination may initiate a transfer.

Client: The terminal that initiates the transfer is called the "client".

Server: The terminal that does not initiate the transfer is called the "server". In common web transfers, the server is the source.

Nodes: The terminals may be connected by a circuit-switched network, which contains switching nodes.

Channel: A communication "channel" allows nodes that connect to the ends of that channel to exchange information.

Link: A "link" is a channel, except a link does not necessarily extend end-to-end between communicating terminals. It may be necessary to concatenate links to form an end-to-end channel.

Connection: A "connection" exists between nodes when the nodes share state information, and there exists a communication channel between the nodes. This document refers to "TCP connections" which, in addition to the properties of connections, also provide "reliable transfer".

Circuit: A "circuit" or "virtual circuit" delivers information in sequence, except it may introduce bit errors, and its availability for delivering information is independent of the terminal's demand for communication. Virtual circuits are usually isochronous, i.e. the destination(s) receive pieces of information with equidistant temporal separation.

In-band: (Carried on) the same connection that carries the bulk data (e.g., payload data for an application layer) being transferred.

Out-of-band (Carried on) a connection other than the one that carries the bulk data (payload data for an application layer) being transferred.

Figure 7:
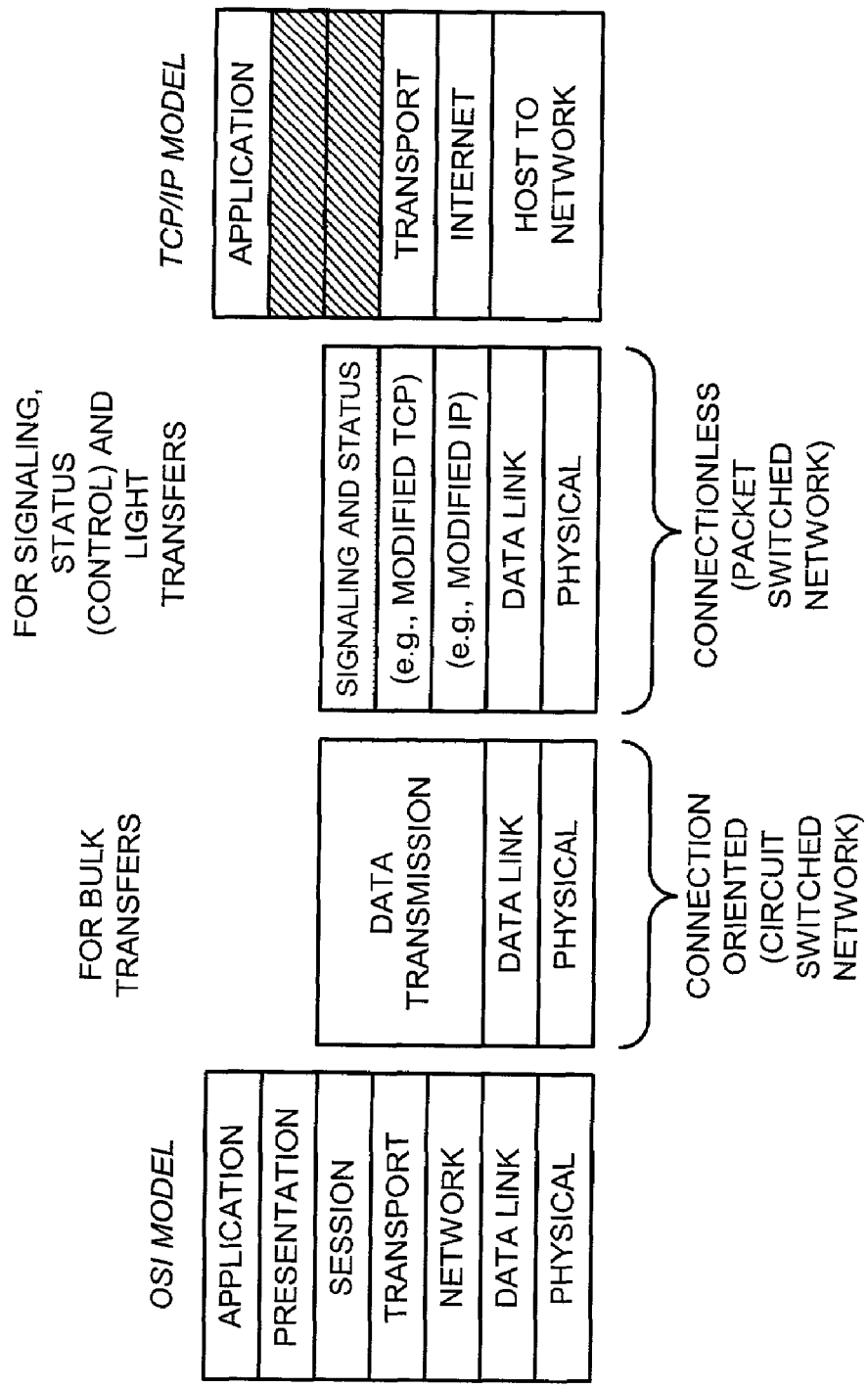
FIG. 7 illustrates how the bulk data transfer and control signaling aspects of the data transfer techniques of the present invention may be thought of as protocol layers.

Layers: As is known, for reasons of modularity (e.g. to decompose the complicated task of communication into tractable parts), nodes that participate in the process of communication are often organized into layers. A key layer is the application layer, which acts as the ultimate source and sink of information. In the case of the present invention, the application layer would usually be a file transfer program. The application is concerned with the content that is exchanged between terminals, but not with the actual process of communicating that content. The application layer uses the services of the transport layer, which, among other things, uses the communication network to provide the type of communication service that the application needs or requests. Some aspects of the data transfer techniques of the present invention can be thought of as a protocol that provides as a transport layer for the application, although other aspects of the present invention use another transport layer. The role of a communication network is to transfer information between terminals. Thus, another layer in a terminal is the network layer, which provides for the delivery of information between terminals. In packet-switched networks, the network layer forms an end-to-end path between communicating terminals by concatenating multiple links. That is, there is a link layer below the network layer. For circuit-switched networks, the network creates an end-to-end circuit, so there is no need to concatenate links. A Network Interface Card (NIC) provides an interface to the network. For circuit-switched networks, a NIC provides an interface to an end-to-end circuit, whereas for packet-switched networks, a NIC provides an interface to a link. A NIC may provide functions such as framing and error detection. In providing these functions, it may limit the size of transmission units that it can handle. (The stippled portions of FIG. 7 illustrate how the bulk data transfer and control signaling aspects of the data transfer techniques of the present invention may be thought of as protocol layers.)

In the following, an exemplary environment in which the present invention may operate is described in §4.1. Then, high-level operations of the present invention are described in §4.2. Thereafter, exemplary methods, data structures and apparatus that may be used to effect those operations are described in §4.3. Finally, some conclusions regarding the present invention are set forth in §4.4.

§4.1 Environment in Which the Present Invention May Operate

The present invention may be used in terminals that can communicate with one another via one or more communications network. Referring to FIG. 1, such an environment 100 may include terminals 110, 170 and communications network(s) 160. Notice that the communications network(s) 160 may include "circuits" 164 and 166 for fast, bulk data, communications (also referred to as "in-band" communications), as well as routes 162 for packet-switched communications (also referred to as "out-of-band" communications). Although the circuits 164 and 166 are indicated as being unidirectional, the present invention can use bi-directional circuits. Further, although the route 162 is indicated as being packet-switched, the invention can operate with other types of communications means, separate from the circuits 164 and 166.

§4.2 High-level Operations of the Present Invention

High-level functions that may be performed by the present invention include providing high-speed, reliable, bulk data (e.g., file) transfer while using communications resources efficiently.

High-speed may be obtained by using high-speed (virtual) circuits and by minimizing overhead (information no used by the application layer) associated with the data (the payload) being transferred. Such (virtual) circuits are used efficiently by reserving them for a period of time that can be determined, with some certainty, in advance of the transmission, and by selecting a (virtual) circuit that meets the constraints of the data transfer, while minimizing the extent to which such (virtual) circuits exceed those constraints. By communicating lower speed and more bursty signaling and control (e.g., status) information out-of-band, that is, by some means other than the high-speed (virtual) circuit, the efficiency with which the (virtual) circuit is used increases. Further, by separating such signaling and control information, which tends to require more complex protocols, overhead associated with the data transfer can be kept simple. Such signaling and control information can use, or build on, existing techniques, such as TCP over a packet-switched network for example.

Reliability may be ensured by providing sequential chunks of data with sequence numbers, and by monitoring the sequence numbers of received chunks. If an error is detected, the necessary chunks can be retransmitted. Since such the inventors believe that the need for such retransmissions will not arise often, such retransmissions may take place over means (e.g., a packet-switched network) other than the high-speed (virtual) circuit (that is, an out-of-band network). Further, since the need for, and the extent of, such retransmissions are more difficult to predict than say the size of the file to be transferred and the speed at which the terminals can transmit and receive it, providing such retransmissions over some means other than the high-speed (virtual) channel permits the reserved capacity of the (virtual) circuit to more closely match that which will be needed, thereby maximizing the efficiency with which the (virtual) circuit will be used. Such means may be the same as that used to communicate control and signaling information. The chunks may also include integrity check values ("ICVs") to further ensure reliable communication of the data. However, in some instances, the invention may rely on integrity check mechanisms already provided at lower layers of the communications protocol stack.

§4.3 Exemplary Data Structures, Methods and Apparatus

§4.3.1 Data Transfer—Overview

Basically, data transfer in accordance with the present invention can be thought of as (i) determining or specifying constraints (e.g., rate at which the terminals participating in the transfer can transmit and receive data, a deadline time at which the data transfer is to be complete, etc.) to which the data (file) transfer is to be subject, (ii) reserving a (virtual) circuit between the terminals participating in the transfer, subject to the constraints, (iii) preparing the data (file) (e.g., segmenting, adding overhead information, etc.) for transmission, iv) transmitting the prepared data, (v) detecting errors in the data received, (vi) notifying the source terminal of detected errors, and (vii) recovering, if possible, from the detected errors.

An exemplary apparatus for effecting such a data transfer is first described in §4.3.1.1 below with reference to FIGS. 1 and 2. Then, an exemplary message format and exemplary messages that may be used are introduced in §4.3.1.2 below with reference to FIG. 3. Then, exemplary methods and techniques that may be used to effect various operations related to data transfer, as well as exemplary data structures used for communications, are described in §§4.3.2-4.3.7 below, with reference to FIGS. 4-6.

§4.3.1.1 Exemplary Apparatus

FIG. 1 is a bubble diagram of operations that may be performed by, or used in conjunction with, the present invention. As introduced in §4.1 above, the terminal 110 may transmit data to, or receive data from, terminal 170 over communications network(s) 160. For example, application level operations 120 may use the services of communications facility 125 for such communications. The communications facility may include data (file) transfer operations 130 which may use services provided by transport layer operations 140 and network, data link and physical layer operations 150.

The data (file) transfer operations 130 may include file preparation operation(s) 131, communications circuit negotiation and selection operation(s) 132, transmission operation(s) 133, and reception operation(s) 134. As shown, the reception operation(s) 134 may include error detection and notification operation(s) 135, and the transmission operation(s) may include error recovery operation(s) 136. Exemplary methods and techniques that may be used to effect these operations in accordance with the present invention are described in §§4.3.2-4.3.7 below, with reference to FIGS. 4-6.

FIG. 2 is high-level block diagram of a machine 200 which may effect one or more of the operations discussed above, and the data (file) transfer operation(s) 130 in particular. The machine 200 basically includes a processor(s) 210, an input/output interface unit(s) 230, a storage device(s) 220, and a system bus(es) and/or a network(s) 240 for facilitating the communication of information among the coupled elements. An input device(s) 232 and an output device(s) 234 may be coupled with the input/output interface(s) 230. Operations of the present invention may be effected by the processor(s) 210 executing instructions. The instructions may be stored in the storage device(s) 220 and/or received via the input/output interface(s) 230. The instructions may be functionally grouped into processing modules. The processor(s) 210 may be one or more microprocessors. Alternatively, or in addition, the processor(s) may be field programmable gate arrays ("FPGAs"), application specific integrated circuits ("ASICs"), and the like.

Although the present invention is designed to be suitable for hardware implementation, it may be implemented in software. For compatibility with software implementation, one embodiment of the present invention is tolerant of timers that only have coarse granularity, since this is all that current operating systems offer. (Microsoft Windows provides timers with 1 millisecond periods; Unix provides a time function with microsecond resolution, although the granularity of the actual timer depends on the computer being used.) This affects how the present invention implements rate adaptation, as described below. (Note that with TCP (a transport control protocol designed for software implementation), the finest resolution timer is that controlling delayed acknowledgements, which has a resolution of 200 ms. The other timers in TCP have resolutions of 500 ms. TCP maintains seven timers per connection, although only four of them may be active at any time.) One embodiment of the present invention also allows terminals to negotiate the representation of sequence numbers (Big or Little Endian), so software implementations do not need the overhead of converting sequence numbers to a standard network format (typically Big Endian) if they both use a different native format (e.g. Little Endian for the Intel x86 series of processors).

§4.3.1.2 Exemplary Message Format and Messages

The present invention may communicate the data to be transferred, as well as signaling and status information, in messages. An exemplary message format contains certain payload data and certain overhead fields. As indicated in the exemplary message format 300 of FIG. 3, five (5) overhead fields may include a field 310 for carrying a length value, a field 330 for carrying a message type value, a field 340 for carrying protocol control information, padding 350, and a field 360 for carrying integrity check value(s) ("ICV"). In the exemplary message format 300 shown, these overhead fields occur in the order listed, and the payload data 320 is inserted between the length field 310 (if it exists) and the message type field 330.

In one exemplary embodiment, the length of each message is a multiple of 32-bits, to allow word-based implementations of integrity checks which would facilitate high-speed implementation. In one embodiment of the present invention, terminals can negotiate a larger word size (e.g. 64b or 128b) for aligning chunk fields through an "alignment_exponent" parameter in signaling messages. In one embodiment of the present invention, the message source adds sufficient padding to the end of the payload to extend the padded payload to an integer multiple of $2^{alignment\_exponent}$ (i.e. 2 to the power of "alignment_exponent") bits in length. The length of this padding may be conveyed in a "payload_length_indication" message that follows the last chunk of payload.

The exemplary message format shown generally follows a length-value-type structure, which differs from the traditional type-length-value coding structure in two main ways. First, the length field 310 is provided at the front because some lower layers (e.g. packet-over-circuit NICs) provide length information. In such cases, the present invention can shed the length field 310 from its messages, leaving only the type and value. However, the present invention adds a length field 310 to messages that it sends over any channel that does not provide framing (e.g. a TCP connection). The length field 310 is not needed for information that flows over a (virtual) circuit that provides framing (e.g. packet-over-circuit NICs), and would not be needed if the present invention uses a transport protocol that provides a sequenced packet transfer service (as opposed to TCP's sequenced byte stream service). In one embodiment, when the length field 310 exists, it contains an unsigned integer measuring the number of 32b words in the message. Second, the message type field 330 is placed after the payload 320, to co-locate it 330 with other overhead fields such as the ICV field 360 and the protocol control information (e.g., sequence number) field 340 for example. Placing these fields 330, 340, 360 together allows them to be removed together for efficient memory management. The present invention does not require the type field 330 to specify how the length field 310 should be interpreted.

Although the present invention may use alternative message formats, the data (payload) preferably precedes the overhead fields in view of the following. In packet-switched networks, most protocol overhead fields are usually located in a header that precedes the payload. This is because all packets need an address field, and this field is processed before the payload can be processed, so it makes sense that this overhead (and many others, such as sequence numbers) be located in the packet header. (In contrast, with a circuit-switched network, messages need not contain an address, and overhead fields, such as the sequence number can be located in a trailer at the end of the chunk.) A disadvantage of locating overheads in a header is that it may force additional copy operations to re-align the payload as it traverses the protocol stack. For example, consider the movement of a chunk through a destination's protocol stack. If a NIC stores the incoming chunk on a page boundary in a computer's memory, then the payload will not be aligned on a page boundary because of the header. Either the application will need to be able to deal with information that is not aligned on page boundaries (which may introduce complexity and impede performance), or the application will need to copy the payload to a new part of memory, and consequently incur the performance cost of the copying action.

If, on the other hand, the overhead fields are provided in a trailer as is preferably under the present invention, if the NIC stores an incoming chunk on a page boundary, then the payload will start on a page boundary for the application. Further, if the segment size is chosen to equal an integer multiple of the page size, then the overhead fields will occupy a separate page of memory which can be released once they are no longer needed, thereby leaving the payload aligned on full pages of memory, ready for fast access by the application.

As indicated by the callout of FIG. 3, one exemplary message format that may be used in the present invention has three (3) broad categories of messages—transmissions (including chunks of payload) 370, status 380 messages, and signaling 390 messages. Status 380 and signaling 390 messages are collectively referred to as "control" messages.

Within each category of messages, there may be several different message types. In a preferred embodiment of the present invention, a basic set of message types includes "payload_carrier", "negative_acknowledgement", and messages used for signaling, such as "proposal" and "nomination". The message type field 330 is superfluous, and therefore not required (and can be eliminated) for messages that flow over certain channels that only carry messages of the payload_carrier and padding_length_indication types (e.g. packet-over-(virtual) circuit channels that provide rate adaptation, which render "rate_adaptation" messages unnecessary). In one embodiment, the message type field 330 is used when multiple types of message pass over a channel. For example, the message type field 330 is provided for chunks that are "retransmitted" over the packet-switched network (since an "abort_transfer" message may also be sent over this channel), and is provided when rate adaptation messages co-exist with payload chunks on the (virtual) circuit.

The following table summarizes messages used in one implementation of the present invention. Only the first three types of messages ("payload_carrier", "padding_length_indication", and "rate_adaptation") are transmitted on the (virtual) circuit; the other messages are transmitted over the out-of-band (e.g., packet-switched) network(s) ("payload_carrier" may also be transmitted over the out-of-band network(s) under certain circumstances described below).

The last field in the value field of a message is an optional integrity check value ("transmission_ICV" or "Control_ICV"). In general, the "Control_ICV" may differ from the "transmission_ICV". For example, it might provide cryptographically strong authentication to protect against denial of service attacks. The source and destination negotiate the presence of the ICVs, and other, optional fields during (virtual) circuit setup.

The following table shows valid values for various message types, and categories that the message types belong to, in an exemplary embodiment.

| CATEGORY | TYPE NUMBER AND IDENTIFIER | "VALUE" OF MESSAGE (I.E. FIELDS THAT FOLLOW THE TYPE) (OPTIONAL FIELDS IN PARENTHESIS) |
|---|---|---|
| Transmissions (source to destination) | 0 payload_carrier | 0 to S words of payload sequence_number (32 bits) (transmission_ICV) |
|  | 0 padding_length_indication | length of padding in last chunk (32 bits) sequence_number (32 bits) (transmission_ICV) |
|  | 1 rate_adaptation | 0 to "negotiated segment length" -1 words of 0 s (transmission_ICV) |
|  | 2 retransmission | [as for payload_carrier] |
| Status (destination to source) | 3 negative_acknowledgement | sequence_number (32 bits) (Control_ICV) |
|  | 4 positive_acknowledgement | (sequence_number of most-recently received chunk - 32 bits) (Control_ICV) |
| Signaling | 5 abort_transfer | transfer_id reason (Control_ICV) |
|  | 6 proposal | Described below |
|  | 7 nomination | Described below |
|  | 8 defer | transfer_id (Control_ICV) |

Note that the "padding_length_indication" type is synonymous with the payload type in terms of the message type field. A receiver knows that message is of type "padding_length_indication" if it is the second message to be received that is shorter than the "negotiated segment length". Note also that although "proposal" messages are distinct from other messages, it is not strictly necessary to have a proposal type since a receiver knows that a message is a "proposal" by virtue of the fact that it is the first message to be transmitted on the TCP connection. The "proposal" type is only included to maintain a consistent message format, and as a safeguard so that terminals do not mis-interpret other messages as proposals should the "proposal" be lost.

The following sections introduce these messages in the contexts of the services to which they contribute.

§4.3.3 Signaling—Circuit Reservation

Basically, the present invention uses a (virtual) circuit for the bulk data (file) transfer, but uses an out-of-band communications (e.g., packet-switched) network for signaling and the same or another out-of-band communications network for retransmissions (for error recovery). Signaling refers to the negotiation and selection of an appropriate (virtual) circuit for the bulk data transfer. This section describes how the present invention may use an exemplary signaling protocol to establish and release connections that are used for bulk data (file) transfers.

The present invention may use TCP when the signaling will take excessively long. Note that this description of signaling assumes, in the main, that the signaling messages are delivered "reliably". This can be achieved by using a reliable transport protocol, such as TCP, to transport the signaling messages. Other widely available transport protocols may be used to carry information over the packet-switched network, so as to avoid reinventing a reliable transport protocol for packet-switched networks, and so as to simplify the core of the present invention. The specification may use "TCP", without loss of generally, to refer to the transport protocol that operates over the out-of-band (packet-switched) network. The present invention can use TCP in the conventional manner, although some modifications may be made to TCP to improve the signaling performance. Transport protocols other than TCP (e.g. SCTP) could be used for this role, but should provide reliable transfer and flow control. The internet protocol ("IP") may be used as the network layer protocol over the packet-switched network. This is because IP supports TCP, and because IP provides functions such as type of service ("TOS") labeling and per-hop packet processing that the present invention may want to use over the packet-switched network. Open-source implementations of TCP/IP, such as that made available by distributions of the Linux operating system, could form the basis for modified versions of TCP/IP.

The exemplary signaling technique of the present invention emphasizes out-of-band signaling (i.e., signaling is not sent on the same circuit that carries the bulk of the payload, but is sent on a parallel channel). The present invention prefers using out-of-band signaling for several reasons. First, some signaling will typically be required before a (virtual) circuit is established, and this will typically be conveyed through a channel other than the (virtual) circuit. Second, by separating signaling and payload-transfer processing, the payload-transfer processing can operate rapidly without having to deal with more sophisticated (and slower) signaling. For example, by eliminating signals from the (virtual) circuit that carries payload, there is no need to have message types that indicate whether certain information is payload or a signal. Third, signaling exchanges tend to involve relatively small amounts of information being exchanged between endpoints. In-band signaling would require that these exchanges occur over the same high-capacity (virtual) circuit that is intended to be used to convey payload, and would consequently reduce the utilization of the (virtual) circuit. Further, out-of-band signaling allows applications to exchange signaling information before establishing the (virtual) circuit, thereby allowing the applications to only establish the (virtual) circuit when the applications are ready to send payload. This also allows the (virtual) circuit to be more fully and efficiently utilized.

This third reason for using out-of-band signaling is in contrast to the signaling that is typical in packet-switched networks in which an application initiates a connection with a peer server application is that it requests that the layer below it establish a connection with its peer, which in turn requests that the layer below it establish a connection with its peer, and so on until the physical layer. A signal then flows from the client to the server, developing an association at the physical layer. Then, the layers follow in a bottom-up order in exchanging information with their peers (by using the services of the lower layers. Because the associations are built from the bottom-up, if an application needs to transfer information over a (virtual) circuit, then it must get the lower layers to establish that (virtual) circuit, and the application can only then send its signaling information to its peer. This is wasteful, since the signaling exchanges involve short units of information and round-trip propagation delays, leading to poor utilization of fast (virtual) circuits designed to carry payload. The difference between the such bottom-up, in-band signaling and the out-of-band signaling preferred by the present invention is that with out-of-band signaling, the signaling occurs over a different channel than the payload transfer. Put another way, the network layer provides two services—a (virtual) circuit and another (e.g., packet) service. Most protocols provide a single service to their users, forcing the users to use this service to setup their own communication, and for the communication itself. However, it would be inefficient to hold a high-rate (virtual) circuit open while file transfer applications exchanged information (which would require round-trip times), and it may not be possible to open the (virtual) circuit until the application peers are ready (e.g. if the destination of the file transfer initiates the transfer and it does not yet know the length of the file to be transferred, as needed for network layer scheduling).

In one embodiment of the present invention, a source classifies data as being in-band or out-of-band based on which layer initiated the transfer of the data. When the application pushes data to the data transfer operation(s), then the data is transmitted out-of-band, whereas when the data transfer operation pulls data from the application (using an upcall), the data is transmitted in-band. In-band transmission follows a previous transfer initiation phase. In many transport protocols, out-of-band data is known as "expedited data", and its purpose is to send information that is considered to be of higher priority than the "normal data", in particular control information that regulates the flow of normal data. In contrast, in the present invention, the out-of-band data will often propagate slower than the normal data.

In one embodiment of the present invention, under normal conditions where all things go well, the signaling to initiate a transfer can be summarized as three main messages—proposal, nomination and commitment. As indicated in block 625 of FIG. 6, the device to receive the data (file) generates the proposal. Therefore, referring to FIG. 6, if a local application is to send a file to a destination application, it can send a request for a proposal to (the application of) the destination device as indicated in block 630. The client then proposes to the server that a transfer should occur. The proposal describes the client's constraints (e.g., determined in block 620) for the transfer (e.g. a deadline for completion). As indicated by block 645 of FIG. 6, the server (i.e., the device receiving the proposal) responds to the proposal by sending a nomination. The nomination includes negotiated values of parameters specified in the proposal, and is passed to the network layer with a set of transfer opportunities. As indicated by block 640, these "opportunities" correspond to one or more (virtual) circuits that have been determined to satisfy the conditions of the proposal (as well as constraints of the server). The network will indicate to the client a set of transfer "opportunities" that are compatible with the network, and with the server, in a "nomination" message, as indicated by block 645. In response, as indicated by block 650, the client will select one of these opportunities that is compatible with its constraints, and ask the network layer to commit to this opportunity. As indicated by block 655, the network layer will then signal the committed opportunity to the server. Finally, as indicated by block 660, if the server receives a commitment, it can being the data (file) transfer over the "committed opportunity" (i.e., the candidate (virtual) circuits selected).

Having described basic aspects of the exemplary propose-nominate-commit signaling protocol, various implementation details are described.

In one embodiment of the signaling protocol, the client must be able to determine the addresses of the server on both the out-of-band (e.g., packet-switched) network and the in-band (e.g., circuit-switched) network. This may be done by performing a DNS lookup. These two addresses will be referred to as the "packet address" and the "(virtual) circuit address", respectively. For the terminals to communicate using a (virtual) circuit, they must both have (virtual) circuit-switched interfaces, as indicated by having (virtual) circuit addresses. The signaling only continues if both terminals have (virtual) circuit addresses.

Not only must the client and server both have circuit-switched interfaces, but there must be a circuit-switched network connecting them. It is conceivable that the client could instigate the process of determining whether the terminals can reach each other via a circuit-switched network. However, reachability may depend on the constraints for the transfer (required time, and rate). This can be determined after the transmission length (T) and the server's constraints are known. Thus, although the client could instigate a process that might indicate that a (virtual) circuit cannot be established (and this will hopefully be rare), the server can instigate a process that indicates that a (virtual) circuit can be established. Consequently, the signaling of the present invention may advantageously combine the determination of whether the terminals can reach each other with the determination of whether the terminals can reach each other with a (virtual) circuit that meets all constraints.

Referring back to FIG. 1, although the transport layer operation(s) 140 is not directly concerned with the transmission length, it uses a network-layer 150 channel, which will not become available until after the transmission length is known. Thus, the transport layer signaling is influenced by when the transmission length is known. The transmission length depends on the data (file) length, and on the segment length constraints at the source and destination, since these constraints may require overhead, based on the payload, to be sent. Consequently, an exact transmission length cannot be fully determined until the server becomes aware of the client's constraints, and establishes a set of mutual constraints. Thus, the exact transmission length will only be known once the server has received the client's request. Circuit, or virtual circuit, setup will not commence until this time.

The client does not instigate a reachability determination because the transmission time (T), which is determined before the establishment of (virtual) circuits, depends on the segment size that will be used, which, in turn, depends on the server's parameters. Furthermore, if the client is the destination, then it would not know the length of the file, and so would have little idea of the transmission time. Once the server receives the information that its application is offering the network layer (if any), it will be able to determine the transmission time, and then instigate a reachability determination. (Note that in an alternative embodiment, setup delay could be reduced by an end-to-end delay if source client started the opportunity determination process with their request. However, this increase in performance increases complexity.)

Various implementation specific details of exemplary proposal, proposal serving, nomination and commitment signaling and processing are now described in §§4.3.3.1 through 4.3.3.4 below.

§4.3.3.1 Proposing a Transfer

In one exemplary signaling technique that may be used in the context of the present invention, to initiate a transfer, the client establishes a TCP connection to the server's packet address. The TCP connection is established in essentially the standard manner, except that the connection request ("SYN") carries payload information containing the "proposal" message (defined below). The TCP specification allows connection requests to carry payload information, although this feature is not often used. The exemplary embodiment, however, exploits this feature to improve performance by reducing the transfer setup times. If the implementation of TCP does not offer this feature, then the payload information can be sent after the TCP connection has been fully established.

Although a TCP connection request can carry payload information, TCP servers generally do not deliver this payload information to their application until they receive an acknowledgement for their reply to the client's request. This prevents a connection request that gets duplicated within the network from causing duplicate connections, and consequently duplicate delivery of the connection request payload to the application. A data transfer technique of the present invention isn't a normal TCP application, in that it expects to contribute to the process of reliable transfer. In one embodiment of the present invention, the server can ensure uniqueness by discarding incoming "proposal" messages that have the same "client_time" and "transfer_id" as another proposal that has recently been processed. Thus, this embodiment of the present invention should use a slightly customized TCP implementation that provides access to payload when a connection request arrives. To reiterate, this will improve the performance of the present invention, but is not required for correct operation. An exemplary format for this "proposal" message is as follows:

| 32-bit word # | Meaning | Type | Valid values |
|---|---|---|---|
| 1 | type = "proposal" | Signal | proposal |
| 2 | TOS_preference | tos_t | all |
| 3 | client_max_rate | Rate_t | all |
| 4 | client_time.seconds | Signal | all |
| 5 | client_time.nanoseconds | | |
| 6 | deadline.seconds | Signal | all |
| 7 | deadline.nanoseconds | | |
| 8 | late_prob | Prob_t | 0 < late_prob < 1 |
| 9 | MaximumBurstTolerance | Uint32 | all |
| 10 | RATechnique (As nominated by client.) | RATechnique_t | all |
| 11 | server_port | internet_port | all |
| 12 | endian_format (As nominated by client.) | endianes_t | all except require_little |
| 13 | alignment_exponent (As nominated by client.) | Uint32 | [5, 12] |
| 14 | pack_frequency | Uint32 | all |
| 15 | transmission_icv_type (As nominated by client.) | icv_t | all |
| 16 | control_icv_using (As nominated by client.) | icv_t | all |
| 17 | control_icv_preferred | icv_t | |
| 18 | transfer_id | bits32b | all |
| 19 | segment_required_min len | constraint | all |
| 20 | segment_required_max len | | |
| 21 | segment_preferred_minlen | | |
| 22 | segment_preferred_maxlen | | |
| 23 | sizeof client_app_info | uint32 | all |
| any additional words | client_app_info Client application information (e.g. the payload size, P, in bytes) | bits32b | all |
| (last word(s), if control_icv_using ≠ none) | (Control_ICV) | depends on control_icv_using | all |

The client's "TOS_preference" field indicates the "Type Of Service" that they prefer: to minimize delay or maximize (virtual) circuit utilization. The "client max rate" field defines a maximum rate of transfer between the protocol of the present invention and the network layer for the client. The server will use this as an upper bound on the rates of opportunities that it nominates. The "client_time" field principally exists to help nodes measure how long it takes signaling messages to propagate through the network, so that they can nominate useful transfer opportunities that are likely to occur after the signaling messages have propagated to the necessary nodes. A second purpose for the "client_time" field is that the client can use it in conjunction with the "transfer_id" field to associate a "nomination" message with the corresponding "proposal". The server returns in its "nomination" with the same "transfer_id" as was included in the "proposal". The client is free to choose any "transfer_id" for the file transfer. The "transfer_id" may also be used to help defend against replay attacks. The "deadline" field, when non-zero, indicates the time by which the client seeks the file transfer to complete. There is always a possibility that a "deadline" will not be able to be met. Accordingly, in one embodiment, the client also specifies a "late_prob", which indicates the probability with which the transfer can overrun the deadline. A client that is the source for the transfer sets the "MaximumBurstTolerance" field to 0. A client that is the destination for the transfer sets the "MaximumBurstTolerance" field to indicate the depth of its buffer (in 32b words) for recovering from the burstiness that rate adaptation can introduce. The "RATechnique" field indicates the client's preferred Rate Adaptation technique. The "server_port" field indicates the port on the server through which the transfer is requested. For example, the server_port may equal 80, indicating an HTTP transfer. The "endian_format" field reflects the client's preference for Big or Little Endian representation of Sequence Numbers. Implementations preferably support the Big Endian format, although a client that also supports Little Endian format could indicate its preference. The server will decide which format to use. This negotiation of the Endian format follows that of Boecking, and allows simplification of software implementations of the present invention in the case that communicating terminals use a common format that differs from a standard (e.g. Big Endian) format. The "alignment_exponent" field is the base-2 logarithm of the word size (measured in bits) that the client would prefer to use for chunks. For example, a client using 64b words would supply an "alignment_exponent" of 6. Implementations would support 32b words ("alignment_exponent" of 5), and could also support larger word sizes. The "alignment_exponent" value is preferably no larger than 12 (indicating alignment on a word size of 512 B), since larger alignment may be impossible for network layers that only marginally meet the present invention's MTU requirement in one embodiment. The "alignment_exponent" field affects the size of padding added to the final chunk, and the sizes of chunk "length" and "type" fields when they exist. The "pack_frequency" field indicates when the destination should send periodic positive acknowledgements to the source. If the client does not require positive acknowledgements, then it sets the "pack_frequency" to 0. If the "pack_frequency" is positive, then the destination sends a positive acknowledgement at the end of the file transfer in order to provide a delivery indication to the source. A "pack frequency" of all is ($2^{32}-1$) indicates that the source requires a positive acknowledgement only for the purposes of delivery indication. Other positive "pack_frequency" values indicate the frequency (in acknowledgements per hour) with which the destination should provide positive acknowledgements to the source during the transfer. (A preferred technique of the present invention does not provide for positive acknowledgements during the transfer, but not to indicate delivery.) If the client is either the source or destination, then it may raise the "pack_frequency" to a rate that ensures that "soft state" information will be maintained during the connection. If the client is the source, then it can set the "pack_frequency" to a positive level to help it drain its retransmission buffer. Measuring the "pack_frequency" over an hour allows very low rates of positive acknowledgements, if necessary (e.g. to maintain connection state in intermediate systems). Coding the "pack_frequency" using a 32b field allows positive acknowledges to recur as often as once every 0.838 µs, which should be sufficiently frequent for the most demanding applications. The "transmission_icv_type" field is used for the client's nomination for the type of ICV that the present invention adds to "payload_carrier" messages, if any. The "control_icv_using" and "control_icv_preferred" fields may be used as follows: In one embodiment, all terminals support the CRC-32 type of ICV. A data transfer technique of the terminals may also support other types of ICV, such as no ICV, checksums, or SHA. A client should use a CRC-32 for its "proposal" message to maximize the chance that the server will understand its "proposal". However, if a CRC-32 does not provide adequate security for the client, then it may use a different type of ICV for its "proposal". The "control_icv_using" field indicates the type of ICV that the client has used for the "proposal". The "control_icv_preferred" field indicates the type of ICV that the client would prefer to use. If the server also supports the preferred ICV, then it should use that type of ICV in its "nomination" message, and both client and server SHOULD use that type of ICV for subsequent control messages (e.g., "negative_acknowledgement"). Finally, the "transfer_id:" field is an identifier chosen by the client to identify the proposed transfer. The client and server will use this identifier in subsequent messages relating to the transfer.

Before describing the segment length constraints, it is necessary to explain the types of constraints and how they are encoded. There are two basic types of constraints—required and preferred. Required constraints are those which must be satisfied, in one embodiment, in order for the transfer to proceed. Preferred constraints are those which are desirable for performance reasons, but need not be satisfied during the transfer.

Constraints may be encoded as follows. Each constraint may be specified as a range of values, with the lower and upper limits of the range encoded in 32-bit words. Segment length constraints may be measured in terms of 32-bit words. (The subsequent "nomination" message and commit signal may also include rate constraints, measured in bytes per millisecond, and time constraints, measured in seconds and nanoseconds.) The constraints may be represented as unsigned integers in network format (Big Endian). A value of 0 indicates that there is no constraint, not that the terminal requires or accepts null-sized messages or no transmissions.

Message length constraints may be used to reflect such things as the sizes of buffers in nodes and the type of framing used at lower layers. The message length constraints lead to a "negotiated segment length" which directly affects the segmentation process, and the size of "rate_adaptation" messages used for stuffing-based rate adaptation. Message length constraint negotiation is similar to the Maximum Segment Size ("MSS") option of TCP. An example of a preferred message length constraint arises when the terminals seek to align the segment length with their memory page size, or the size of blocks used for disk storage, so as to improve performance. This may be expressed by setting the lower preference limit equal to the multiplier, and the upper limit equal to 0. Message length constraints may be expressed in terms of segment lengths. For example, a frame length limitation of 8096B translates into a segment length constraint of 8092 B when the only overhead is a 32b sequence number (no ICV at the layer of the present invention).

The "client_app_info" field may include any information that the client application supplied (e.g. file length, or name of file to download). The "client_app_info" may be preceded by an indicator of its size (sizeof_client_app_info), since the proposal is sent on the unframed TCP connection.

§4.3.3.2 Serving a Proposal

When a server receives a "proposal" message, it offers any "client_app_info" from the "proposal" to its application. The application may respond by either (i) aborting the transfer, (ii) initiating a transfer using the connectionless (e.g., packet) network, (iii) deferring the transfer, or (iv) sending a nomination. Each of these possible responses is addressed below.

If the application chooses to abort the transfer, the server may send an "abort_transfer(APPLICATION)" message to the client, gracefully close the TCP connection, and ignore the "proposal". Two possible reasons for aborting a transfer are if the server application is the destination of a transfer of a file that will be too large to be stored on its disk, or if the server application is the source of the transfer of a file that is not available. The client application can distinguish these errors by knowing its role (source or destination) in the transfer.

The application may choose to initiate the transfer using the out-of-band (e.g., packet) network, rather than a (virtual) circuit. This may be done by indicating a rate of 0, in which case the transfer may revert to using TCP.

If the application chooses to defer the transfer, the server may send a "defer" message to the client, and queue the "proposal" for later processing. The "defer" message accommodates cases when the server has sent a "proposal" or "nomination", but has not yet received the corresponding commit signal. In these cases, the server may not be able to immediately determine its future availability (as may be required to process the incoming "proposal" message). The "defer" message allows the server to promptly reply to the client, indicating that the server is functioning, but to defer the response to the client until after it has dealt with outstanding "proposals" and "nominations". Clients have may be provided with a "PATIENCE_FOR_NOMINATION" parameter that specifies how patient they are when waiting for a "nomination", and they can send (towards the server) an "abort_transfer(PROPOSAL_EXPIRED)" message if no "nomination" is forthcoming before that time. Queued transfer "proposals" should be served in a first—come first-served discipline. The data transfer operations of the present invention may indicate to the application the number of queued "proposals", or, alternatively, may leaves it to the application to determine how much capacity to assign to each "proposal". (For example, the first transfer to complete initiation may consume all of the available capacity, even if it completes initiation while there are also other transfer "proposals" queued.)

Finally, the application may choose to send a "nomination", indicating that the transfer signaling should proceed. The "nomination" may specify the application's constraints on the transfer, and optionally supply information for the network layer.

§4.3.3.3 Nominating Opportunities (In Response to a Proposal)

When the data transfer operation(s) of the present invention receives a "nomination" from its application, it may then resolve the client's constraints with its own to determine the negotiated value of parameters. Negotiated parameter values should conform to both client and server constraints wherever possible. This means that each negotiated parameter value should be no smaller than any lower limited expressed as a constraint, and no larger than any upper limit expressed as a constraint. If there are no mutually agreeable values for a required constraint (e.g., "MaximumBurstTolerance", "segment_required_minlen", or "segment_required_maxlen"), then the server will issue an "abort_transfer(INCOMPATIBLE_*)" signal, where * is the name of the unresolvable constraint.

The manner by which the server resolves differences between its and the client's preferences will not affect interoperability. While the server could selfishly resolve all differences in its favor, in the interests of all terminals, it should resolve differences between the client and server's preferences as follows.

Conflicts in "TOS_preference" should be resolved in favor of destination. Generally destinations derive value from information, and therefore generally pay for the communication channel. Accordingly, they should have control of speed/cost preferences. (Note that this is in contrast to the most widespread circuit-switched network—the telephone network—in which the client controls the speed/cost preference.) (If multicast transmission is to be supported, it may not be possible to favor multiple destinations that have different preferences. In this case, the source's preference should have priority.)

If there are conflicts in the segment length, the length should be as long as possible. For example, the server could minimize processing requirements by choosing the larger preferred length, or it could minimize transmission requirements by choosing the preference that will minimize the transmission overhead. In the unlikely event that two preferences have the same transmission overhead, the larger preferred segment length should be selected. The value that the server chooses for the segment length is known as the "negotiated_segment_len".

Any conflicts in Endian format should be resolved in favor of destination. This is to follow a general principle of simplifying the destination. The server converts the rate constraints of the serving application into (virtual) circuit rates. The (virtual) circuit rates account for transport layer overheads, given the negotiated segment length.

The server will become aware of the information that the source application is offering the network layer (as supplied by either the client or server application). That information would indicate the length of the file to be transferred, although the only concern of data transfer operations is that the application and network layer exchange information. The server will then give this information to the network layer so that it can decide whether to attempt to establish a (virtual) circuit with the client, and if so, to start the attempt. If a (virtual) circuit is preferred, then the terminals may determine whether they can reach each other with a (virtual) circuit that satisfies the constraints. Note that the server may decide to revert to using a connectionless communications (e.g., TCP) network if the transmission length is too small to justify the overhead associated with setting up the (virtual) circuit.

If the server decides to use a (virtual) circuit, then after it receives the response from the application, it will compose a list of transfer opportunities. Transfer opportunities may be thought of as specific intervals during which nodes indicate that they can accommodate the proposed transfer at certain rates. These transfer opportunities reflect the rate constraints of the application when possibly multiplexed between multiple transfers over time. In one embodiment, a value of 0 for a "start_time" or "end_time" indicates "whenever". That is, the transfer can start or end at any future time for that rate. The server should select a list of transfer opportunities that extend sufficiently far into the future so that the probability that none of the opportunities will be suitable to all nodes involved in the transfer is less than "late_prob".

In one embodiment of the present invention, it is assumed that the transfer will occur at one rate over one contiguous opportunity. Alternative embodiments might permit a transfer to be spread across multiple opportunities, which may be discontiguous, or offer different rates. Thus, the server should nominate the broadest opportunities possible. The client may need to use a lower rate, and so extend the holding time.

In one embodiment of the present invention, each nominated transfer opportunity must satisfy the following three requirements. First, the "start_time" for the opportunity must exceed the "client_time" and "server_time". Second, each nominated opportunity must be long enough to complete the file transfer. That is, the product of the "available_rate" and interval between "start_time" and "end_time" must match or exceed the transmission length (T) (i.e. available_rate*(end_time−start_time)>T if the start_time and end_time are non-zero). Third, the opportunity must have an "end_time" that is no larger than any "deadline" indicated in the proposal or by the application. If no such opportunity exists, then the server will not send a "nomination", but will send an "abort_transfer (CANT_MEET_DEADLINE)" message.

Each nominated transfer opportunity should have a "start_time" that is later than when the commit signal will reach the server. Nodes can use the "client_time" and "server_time" (in the "nominate" message) to estimate how long it will take the signaling to complete, and so estimate how far into the future that the earliest opportunities that they nominate should be. A switch that has an internal notion of "switch_time" should only nominate opportunities that occur after "switch_time"+

2*"server_time-client_time". The factor of two (2) accounts for the worst case in which the switch is adjacent to the server, so the transfer cannot start for another round-trip time(so that the "nomination" can reach the client, and the commit signal can reach the server). The "server_time-client_time" component records the time that the request took to propagate from the client to the server, and so should be indicative of the time that the commit signal will take to follow the same path.

Once a server has determined the file length (either from a setup request from the source or from the application), it may send a "nomination" to the client. The following table shows the structure of an exemplary "nomination" message.

| 32-bit word # | Meaning | Type | Valid values |
|---|---|---|---|
| 0 | type = nomination * | | 8 * |
| 1 | negotiated_segment_len | | |
| 2 | RATechnique (As agreed by client and server.) * | | |
| 3 | endian_format (As agreed by client and server.) * | | require_little or require_big * |
| 4 | Alignment_assignment (As agreed by client and server.) * | unsigned integer | [5, 12] |
| 5 | pack_frequency | | |
| 6 | transmission_icv_type (As agreed by client and server.) * | | 0 = none other values: reserved for future use |
| 7 | control_icv_type (As agreed by client and server.) * | | 0 = none other values: reserved for future use |
| 8 | transfer_id | | value as received from the client * |
| 9 | sizeof_server_app_info * | uint32 | |
| any additional words | server_app_info Server application information * | | |
| (last word (s), if control_icv_type ≠ 0) | (Control_ICV) | | |

A "*" denotes substantial variations from the "proposal" message.

The "negotiated_segment_len" field indicates the segment length that the server and client will use. Note that the network layer only considers the "negotiated_segment_len" as a multiplier for the "transmission_length"; it has no concern about the size of segments that the present invention sends over the (virtual) circuit. The "RATechnique" field indicates the negotiated rate adaptation technique that will be used during the transfer. If the RATechnique is "stuffing", then the source includes the type with payload_carrier messages that it sends (to distinguish them from rate_adaptation messages). However, the destination can use the message length to discriminate stuffing "rate_adaptation" messages from most "payload_carrier" messages. The "endian_format", "alignment assignment", "pack_frequency", "transmission_ icv_type" and "control_icv_type" fields have the same meaning as in the "proposal" message, except here they indicate the value that will be used in the transfer, as agreed by client and server, rather than just indicating the client's proposal. Hence, the "endian_format" is one of the required types, and is not a preferred type. In selecting the "pack_frequency" to use, the server chooses the higher of its preference and the client's preference. The "transfer_id" field matches that of the corresponding proposal message. The server application knows the length of the file when it receives the "proposal", either from information conveyed in the "client_app_info" in the "proposal", or from information conveyed by the server's application to its network layer. The "server_app_info" exists to allow other attributes of the file to be conveyed, e.g. time of last modification, and also allows a server source application to tell the client destination application the length of the file. Like the "client_app_info" in a "proposal" message, the "server_app_info" is preceded by an indicator of its size ("sizeof_server_app_info"), since the "nomination" is sent on the unframed TCP connection.

An example of network signaling to request a (virtual) circuit is now described. When the server sends a "nomination", it also sends a request to the network layer to establish a (virtual) circuit between the client and the server. An exemplary request for a (virtual) circuit may carry the following information:

| 32-bit word # | | Meaning | Valid values | Comment |
|---|---|---|---|---|
| 1 | | TOS_preference | | |
| 2 | | client_time.seconds | | |
| 3 | | client_time.nanoseconds | | |
| 4 | | server_time.seconds | | |
| 5 | | server_time.nanoseconds | | |
| $3i + 6$ | $\forall i \in Z:$ $0 \leq i \leq m$ $m \in Z, m > 0$ | available_rate | bytes per millisecond on the (virtual) circuit (non-zero) | triplets describing transfer opportunities |
| $3i + 7$ | | start_time.seconds | | |
| $3i + 8$ | | start_time.nanoseconds | | |
| $3i + 9$ | | end_time.seconds | | |
| $3i + 10$ | | end_time.nanoseconds | | |
| $3m + 11$ | | transmission_length (T) | | |
| $3m + 12$ | | source | | |
| $3m + 12$ | | transfer_id | value as received from the client | |

The "server_time" field helps nodes select opportunities that are likely to start after the commit signal reaches the server. The most significant bit of the "transmission_length" field indicates the type of coding for the "transmission_length". When the most significant bit is set to 0, the 31 least significant bits of the "transmission_length" field indicate the transmission length in multiples of the "negotiated_segment_len" (rounded up to the nearest integer). Using such a fixed coding for the transmission length conflicts with the desired feature of allowing arbitrary file lengths. However, since the "negotiated_segment_len" will be at least 512 B, this coding can describe files as long as $2^{31} \times 512$ B−1 TB, which should be large enough to cover most files for the foreseeable future. Note that the exemplary signaling of the present invention only caries the "transmission_length" for the application and (virtual) circuit; and is designed to work irrespective of how long the file may be. In an alternative embodiment, the most significant bit could be set to 1 to indicate an alternative coding of the transmission length. Two options for describing longer transmission lengths are now introduced. First, if the remainder of the "transmission_length" field was all 0s, then a specific opportunity (e.g. the first) could be set so it is as short as possible, i.e. its transmission volume matches the transmission length. Second, the "transmission_length" field could be considered to consist of all information leading up to the "Separator". The transmission length could use bit stuffing to prevent it containing a 32b word of all zeros (which would match the "Separator"), or it could be encoded in a type-length-value format.

The network layer would preferably protect the signaling message to ensure that the parameters specified are not erroneously altered as they propagate through the network.

If a node receives a "nomination" message or commit signal that has a "transfer_id" value that does not match the "transfer_id" in an earlier "proposal" message that it has observed, then the node may send an "abort_transfer(UNRECOGNIZED_IDENTIFIER)" message to the source of the "nomination" or commit signal.

Once the server has sent the nomination, it waits for any of: (i) a commit indication from the client; (ii) an "abort transfer (INADEQUATE OPPORTUNITIES)" message; (iii) an ICMP "Host Unreachable" message; (iv) a timeout; or (v) an "abort transfer" message from the client. Each of these cases is introduced.

Figure 6:
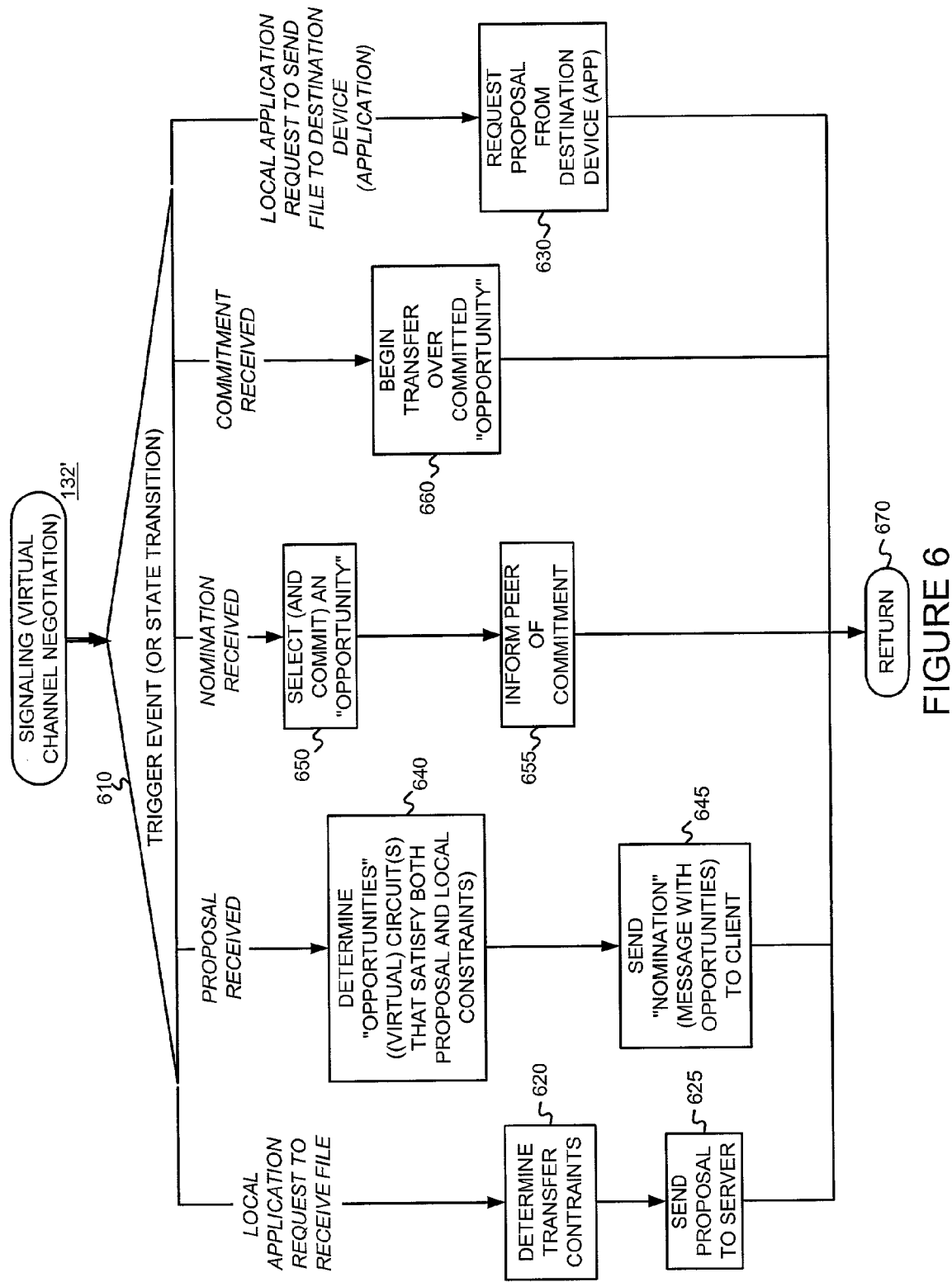
FIG. 6 is a flow diagram of an exemplary method that may be used to effect signaling used for selecting a (virtual) circuit for data transfer.

A commit indication from the client indicates that the client, and all switches, have committed to one of the opportunities proposed by the server. The data transfer phase will proceed using the committed interval. Referring to FIG. 6, this is illustrated by block 660.

An "abort_transfer(INADEQUATE_OPPORTUNITIES)" message indicates that the "nomination" could not reach the client while maintaining at least one opportunity that satisfied the constraints of all nodes on the path from server to client.

An ICMP "Host Unreachable" message could occur if the "nomination" could not find a route given the loose source routing constraints (e.g. if the client and server are not reachable through the circuit-switched network). In this case, the data (file) transfer application(s) may revert to using a connectionless (e.g., packet or TCP) network) for the transfer. (Note that ICMP errors are not reliably transmitted, so an ICMP Host Unreachable message may be sent, but not received, leading to a timeout, described next.) If the server does not receive a commit signal, which corresponds to its "nomination", within "COMMIT_PATIENCE", then it may revert to using a connectionless (e.g., packet or TCP) network for the transfer.

Finally, an "abort_transfer" message from the client may occur if the client no longer wishes to proceed with the transfer (e.g., because a user of the file transfer program aborted the transfer—"abort_transfer(APPLICATION)").

The "nomination" message may be propagated from server towards client as follows. The network will preferably use the list of transfer opportunities supplied by the server to prepare itself to provide a (virtual) circuit during one of the transfer opportunities. Such a network would also indicate, to the client, a list of transfer opportunities that are acceptable to the network, and, by implication, acceptable to the server.

In one embodiment of the present invention, it is assumed that a single (virtual) circuit request message propagates unidirectionally through the network of circuit-switches, hopefully finding a suitable path for the (virtual) circuit. In alternative embodiments, it may be possible to allow a (virtual) circuit request to backtrack towards the server if it reaches a node where there are inadequate opportunities. The (virtual) circuit request could then attempt to proceed along a path other than that which suffered from inadequate opportunities. It may also be possible to allow the (virtual) circuit request message to follow all possible paths through the network of circuit-switches, and find the best path for the (virtual) circuit. In this case, the client would be changed so that it can decide when it receives a (virtual) circuit request whether it should be satisfied with that (virtual) circuit request, or should continue waiting for more (virtual) circuit requests.

It is contemplated that "nodes" may revise the opportunity list in a "nomination" to reflect their own constraints as the "nomination" propagates from the server to client. The "nodes" that revise the opportunity list include switches on the path from server to client, and the client itself. If a node will not be available during an opportunity listed in an incoming setup "nomination", it may then delete the triplet for that opportunity from the setup "nomination". If it will be available for only part of the opportunity, then it may modify the opportunity to indicate when it is available, e.g., adjusting the "start_time" or "end_time" of the opportunity, or replacing the opportunity with multiple opportunities that cover the intervals during the nominated opportunity when it will be available. If the node is only available at a lower rate than that nominated in the opportunity, then it may revise the rate listed for the opportunity. In one embodiment of the present invention, the node may ensure that any opportunities that remain in the "nomination" meet certain requirements. The number of opportunities in the revised "nomination", may differ from the number of opportunities in the incoming "nomination" because of compromises between the nodal availability, which may eliminate opportunities or split opportunities into parts.

If a node receives a setup "nomination" that includes an opportunity with a rate intermediate between two rates that the node supports, then the rate that it chooses should account for the negotiated TOS, as decided by the server. It is assumed that any node that uses a rate higher than the rate specified in the opportunity provides any necessary rate adaptation. For example, the node could use the stuffing type of rate adaptation described below.

Before a node forwards a "nomination" with certain transfer opportunities, it should make tentative reservations for these opportunities for the transfer associated with the "nomination". These tentative reservations will prevent subsequent "nominations" from being assigned resources that would interfere with the node's ability to fulfill its commitment to this "nomination". In such a case, the node should release all tentative reservations that are not needed for a committed opportunity either when the commit signal returns, or when it times out "COMMIT_PATIENCE" seconds after sending the "nomination".

§4.3.3.4 Committing to One Transfer Opportunity

If the (virtual) circuit request reaches the client, it will indicate any transfer opportunities that are mutually agreeable to the server and all switches. The client can then revise the opportunity list, as described below, to meet its own requirements.

If one or more opportunities remain, then the client preferably selects the opportunity that would cause the transfer to complete the earliest (i.e. the opportunity for which "start_time"+"available_rate"*T is lowest). The client revises the "end_time" for the selected opportunity so that "end_time"=⌈"start_time"+T*"rate"⌉. The client will then remember the "rate", "start_time", and "end_time" for that opportunity, and send a commit message to the network layer, which would, preferably, ensure that the server and switches commit to the opportunity that it has selected. The client may then inform the network layer signaling to commit to using the specified transfer opportunity, and to release any resources that may have been tentatively reserved for other transfer opportunities. Information that the client provides to the network layer when committing to a transfer opportunity may include the following:

| 32-bit word # | Meaning | Coding |
|---|---|---|
| 1 | rate | |
| 2 | start_time.seconds | |
| 3 | start_time.nanoseconds | |
| 4 | end_time.seconds | |
| 5 | end_time.nanoseconds | |
| 6 | switch_ICV | |
| 7 | transfer_id | value as received from the client |

The "start_time" value should be specific, not ambiguous (e.g., "whenever"). The network will preferably convey the commit signal to the server. The server will then preferably release all resources tentatively reserved for a "nomination" that had the same "transfer_id" as the commit signal, except for resources that are required to support a transfer during the interval nominated in the commit signal. The server will preferably also release all resources associated with the transfer at "end_time". If the server receives the commit signal after the "start_time", then it may send an "abort_transfer (STARTED_TOO_EARLY)" message to the server.

§4.3.3.5 Aborting Transfers

This section summarizes different types of "abort_transfer" messages that may be supported by the data transfer operation(s). In one embodiment, each "abort_transfer" message may include the "transfer_id" for the transfer that is being aborted, and a 32b parameter that describes the "reason" for the abortion. As an "abort_transfer" message propagates on the path between communicating terminals to the peer application, nodes will preferably release resources that are associated with that "transfer_id".

A transfer abortion may be initiated by the application operation(s). When the application initiates an abortion, the data transfer operation(s) will send the abort_transfer message to the peer application.

A transfer abortion may be initiated by the data transfer operation(s). For example, "TIMER_LONG_EXPIRED", "INCOMPATIBLE_MaximumBurstTolerance", "INCOMPATIBLE_segment_required_minlen", "INCOMPATIBLE_segment_required_maxlen" or "PACKET_CONNECTION_FAILED". More specifically, if the TCP connection is reset, or fails, before the end of the transfer, then the terminal that observes the reset/failure sends an "abort_transfer (PACKET_CONNECTION_FAILED)" message to its peer. Note that the "PACKET_CONNECTION_FAILED" cannot be sent over TCP like other "abort_transfer( )" messages, since it is indicating that the TCP connection failed. Instead, "PACKET_CONNECTION_FAILED" can be sent using a "best effort" protocol such as UDP. Notwithstanding the fact that "PACKET_CONNECTION_FAILED" messages may not reach the peer terminal, they are useful for indicating the reason of the transfer abortion to the local application. When the data transfer operation(s) initiates a transfer abortion, it will preferably indicate the transfer abortion to the local application, and send the "abort_transfer" message to the peer terminal.

A transfer abortion that can be initiated by either the data transfer operation(s) or network layer operation(s) may include "PROPOSAL_EXPIRED", "INADEQUATE_OPPORTUNITIES", "UNRECOGNIZED_IDENTIFIER", or "STARTED_TOO_EARLY". A transfer abortion that is initiated by the network layer may be "NETWORK". The network layer can abort a transfer, e.g. if the (virtual) circuit supporting the transfer fails or is preempted. In such a case, the network layer preferably sends an "abort_transfer(NETWORK)" message to both ends of the (virtual) circuit, and when a data transfer operation(s) at either terminal receives such a message, it will preferably forward the indication to the local application.

§4.3.3.6 Short File Transfer

It may not always be possible to establish a (virtual) circuit between source and destination to perform a file transfer, and it may not be worth establishing a (virtual) circuit for "short" files, for which the transmission time will be insignificant compared to the (virtual) circuit initiation time. For such transfers, the present invention may use an alternate transfer mechanism, namely reverting to using a packet-switched network (e.g., TCP) for the transfer. Data transfer operation(s) of the present invention may include a parameter called "SHORT_THRESHOLD" that defines the threshold length for which files shorter than this threshold are sent using the packet-switched network.

§4.3.4 Transmission Constraint Determination

It is assumed that the application can predict, before a transfer, the rate at which it will be able to transfer a file. The data transfer operation(s) may obtain this information ("app_rate") from the application during signaling before the transfer. Specification of the "app_rate" is complicated by the fact that the performance of the application may vary over time, depending on competing demands for the processor and resources. Ideally, a real-time operating system would be used to provide the application with some assured level of processing capacity. However, in practice, it should be sufficient to benchmark the performance of the application, and for the application to indicate to the data transfer operation(s) that it can support throughputs of the rate indicated in the benchmark. The application should be responsible for deciding how to assign its capacity between potential file transfers. For example, if the application assigns all of its capacity to one transfer, then it may not be able to accept any other concurrent transfers (e.g. in the opposite direction). (Note the contrast with transport protocols, such as TCP, that employ window-based flow control which can accept arbitrary numbers of connections, with the throughput for each connection falling as the number of connections increasing). The rate-based flow and congestion control employed by the data transfer operation(s) may make a terminal block requests for new connections because its processing capacity is fully committed to existing connections.

The transfer of information between the data transfer operation(s) and the application can be bursty because of the nature of the rate adaptation of the data transfer operation(s). In one embodiment, the application is responsible for providing any buffering that may be required to translate between the mean rate described in the previous paragraph, and the rate that may occur during bursts of access.

In one embodiment of the present invention, a source application is able to re-access certain information for retransmission in addition to the rate at which it stated it can supply payload information to the data transfer operation(s). In such an embodiment, however, there are very loose delay constraints on when it needs to supply this retransmitted information to the data transfer operation(s). In this way, the overhead of retransmissions should not detract from the rate that the application can offer. Note that if transfer rates are not known, then the data transfer operation(s) may include flow control between communicating applications. This would interfere with the ability of the data transfer operation(s) to preserve the (virtual) circuit holding time, and so would conflict with the desirable feature of facilitating schedulable (virtual) circuits.

Maximum Transmission Unit limitations

Circuits, and virtual circuits, merely provide a bit stream for the terminals that use them, and so do not provide framing or the Maximum Transmission Unit limitations that exist in packet-switched networks. However, available circuit NICs do provide framing and MTU limitations. Consequently, another reason for segmenting files into fixed-size chunks (in addition to the reasons of reliable transfer discussed in the previous section) is so that these chunks conform to the MTU limitations of the Network (Interface Card).

The mechanism by which data transfer operation(s) of the present invention determines the MTU limitations of the NIC is implementation-dependent. It could be achieved by the network layer providing a function to the transport layer that provides this information, by using management functions to get the value of this parameter, or by a path MTU discovery process, such as that used by TCP.

In one embodiment of a data transfer operation(s) of the present invention, each element (terminal or switch) must have a Maximum Transmission Unit size of at least 576 B. This is a reasonable assumption, since it is the same MTU as is required by IP. The value of 576 ensures that A data transfer technique of the present invention can use chunk lengths of at least 512 B, with some space for A data transfer technique of the present invention overheads.

Congestion Control

Transport protocols designed for packet-switched networks emphasize congestion control, whereby the transport layer is slowed down to match the capacity of the network. However, the present invention does not require this feature for transfers over the (virtual) circuit, since during (virtual) circuit setup it reserves along the end-to-end path sufficient resources to support a transfer at a specific rate. Thus, there is no need for techniques such as the Slow Start of TCP which probe for network capacity, but also force channel utilization to be lower than its potential. Because the present invention does not need to enforce any congestion control beyond that which already exists at the network layer, the data transfer operation(s) of the present invention can fully utilize the (virtual) circuit, supporting the feature of high-speed and eliminating the complexity of congestion control mechanisms also simplifies the data transfer technique of the present invention, further supporting high-speed operation.

Rate Adaptation

Rate adaptation accounts for disparities between the rate at which communicating terminals can communicate payload, and the rates of available (virtual) circuits. Unlike packet-switched networks that can support a continuous range of rates (e.g. all rates from 0 to 100 Mb/s for Fast Ethernet), circuit-switched networks often only support a discrete set of rates. For example, a pure SONET interface may offer circuits in rates that are integer multiples of the base circuit rate, e.g. 51.84 Mb/s. However, an application may be able to process payload information at a rate that is intermediate between available circuit rates (e.g. 80 Mb/s), or below the available circuit rates (e.g. 40 Mb/s).

Since the present invention is designed to offer both efficient (virtual) circuit utilization and high-speed, it allows the client application to specify its preference, and for the server to choose which feature should be emphasized.

If the server decides to emphasize (virtual) circuit efficiency rather than speed, then the terminals could achieve rate adaptation by rounding their rate down to the nearest (virtual) circuit rate. However rounding rates down could lead to a (virtual) circuit not being used in the case that the terminal cannot fully utilize the base (virtual) circuit rate (e.g. an application that can only operate at 40 Mb/s but has a SONET interface). To accommodate this case, and the case of the server deciding to emphasize speed, the terminals could round their rate up to the nearest (virtual) circuit rate. This can be achieved in two ways: By inserting padding messages between payload messages, or by using timers to determine when payload messages should be sent. A data transfer technique of the present invention supports both approaches, and negotiates the approach to use during signaling. In one embodiment of the present invention, nodes support rate adaptation using stuffing, whereas rate adaptation using timed transmissions is optional. The following sections describe the approaches and their relative merits. Both approaches may introduce some burstiness into the flow of information, and destinations will need to specify their Maximum Burst Tolerance (MBT).

Rate Adaptation using Stuffing

A data transfer technique of the present invention allows a source to "stuff" "rate_adaptation" messages between payload messages so as to raise its transmission rate to match the capacity of a (virtual) circuit. Destinations can discard "rate_adaptation" messages, and will effectively receive payload messages with the same interarrival intervals as would occur if the source were transmitting at the lower transport rate. "rate_adaptation" messages should not impose a significant processing load on the source or destination (and so lower the capacity for transferring payload) because the source need only point the NIC to a pre-defined "rate_adaptation" message that it needs to transmit, and the destination can discard incoming "rate_adaptation" messages. Note that the type field is used when rate_adaptation messages share the (virtual) circuit with payload messages. However, the destination can be optimized to expedite processing of full-sized chunks, and to send shorter messages to a slow processing path. By ensuring that "rate_adaptation" messages are shorter than the negotiated segment size, the destination will only need to check the length of incoming messages on its critical path. To support this mode of operation in one embodiment, sources ensure that "rate_adaptation" messages are shorter than the negotiated segment size.

For example, to match an 80 Mb/s transport to a 103.68 Mb/s OC2 (virtual) circuit, the transport layer would insert a "rate_adaptation" message of length (103.68-80)C/80=0.296C bits between each payload chunk. Here, C includes 64 bits of overhead: the 32b sequence number field, and the 32b type field.

The "rate_adaptation" messages, like other messages in one embodiment, need to be multiples of 32b in length, so each "rate_adaptation" message may not be able to perfectly provide the spacing desired between consecutive chunks.

Consequently, "rate_adaptation" messages may be of variable length, and this may cause some jitter in the arrival times of payload messages. For example, with a segment size of 8 KB, C=65600 b, and the optimal "rate_adaptation" message length would be 606.8 32b words. Such adaptation would be provided over five payload messages by separating the first two payload messages with one "rate_adaptation" messages of 606 32b words, and using four "rate_adaptation" messages of 607 32b words to separate the next four payload messages.

Rate adaptation using stuffing is likely to be simpler than rate adaptation using timed transmissions because it doesn't require a timer, and may lead to lower burstiness, reducing the size of destination buffers. Consequently, it is likely to be preferred for hardware implementations. Software implementations will likely prefer rate adaptation using timed transmissions because it requires less frequent responses from the software.

Rate Adaptation using Timed Transmissions

Rate adaptation messages increase the rate at which the source and destination must process messages, above that necessary to process payload messages. While these rate adaptation messages do not need as thorough processing as payload messages, they may increase the load on terminals, and reduce the rate at which the terminals can process payload messages.

An alternative to using rate adaptation messages is for the channel to provide framing, and for the present invention to carefully time transmissions, rather than provide a continual stream of messages as fast as the link allows. Many operating systems only allow timers with coarse resolutions. If the transport layer was limited to transmitting one packet in each timer interval, then it may be limited to transmitting one packet over each long period (e.g. 1 ms), and limit the effective rate of the transport layer. Instead, it is preferable to allow A data transfer technique of the present invention to transmit multiple messages in each timer interval, although this can lead to burstiness.

Maximum Burst Tolerance

The disparity between the (virtual) circuit rate and the terminal rate means that when rate adaptation is used, there is inherently some burstiness in the availability of information to the terminal. To accommodate the jitter (burstiness) that rate adaptation can introduce, in one embodiment, A data transfer technique of the present invention destinations indicate their "MaximumBurstTolerance" during transfer initiation. The "MaximumBurstTolerance" indicates the amount of buffering needed if the destination is to process information at the mean rate, and avoid buffer overflow, while the source transmits in a manner that may be bursty. For example, if a source can transmit at a peak rate of P over an interval of I, then the burst size would be P*I, however the receiver would be consuming at a rate R, and so would have consumed R*I bits over that interval (there may be quantization effects), so (P–R)*I is the volume of excess information, i.e. the required "MaximumBurstTolerance".

Multiplexing

A file server may expect to receive requests from multiple clients, and these clients may request transfers that overlap each other at certain times. A data transfer technique of the present invention may support multiple concurrent transfers through the port numbers that it may use in its signaling messages. The port numbers may be drawn from the TCP port number address space if the present invention uses a TCP socket (combination of source and destination addresses and port numbers) for each transfer (and because the present invention may revert to using TCP for the transfer).

A data transfer technique of the present invention leaves it to the application to decide how resources should be assigned to competing requests. For example, if the application has already committed all of its available rate to existing requests, then it could either reject a new request, confine the new request to using TCP only, or accept the new request for an interval that is some time in the future. In order to defer the transfer until some future time, the client and server will need to be synchronized so that they have a common understanding of when the transfer will occur.

Adapting Applications to Each Other: Flow Control

Flow control ensures that the source transmits no faster than the destination can receive information. This means ensuring that the source does not transmit bursts that are too large to fit in the destination's buffers, and that the source does not transmit at a mean rate that exceeds the destination's capacity to process information (since this would also cause buffer overflow). A data transfer technique of the present invention does not need explicit volume-based flow control because the destination will be able to specify during setup the maximum permissible chunk length, and because the destination can write information to disk as it is received without requiring a re-sequencing buffer. Re-sequencing buffers can also lead to speedup: when a mis-sequenced chunk finally arrives it can release a large amount of information that had been received but had a later sequence number than the mis-sequenced chunk, and so had to be held until the arrival of the mis-sequenced chunk. Because A data transfer technique of the present invention avoids re-sequencing buffers, it will not require flow control to deal with this speedup.

A data transfer technique of the present invention will use rate-based flow control: The source will transmit chunks at a rate whose mean matches the rate that is negotiated during (virtual) circuit setup. This rate will take into account the available rate of communication (virtual) circuits, and the rate at which the source and destination applications can transfer chunks.

§4.3.5 Pre-Transmission Data Preparation

Figure 5:
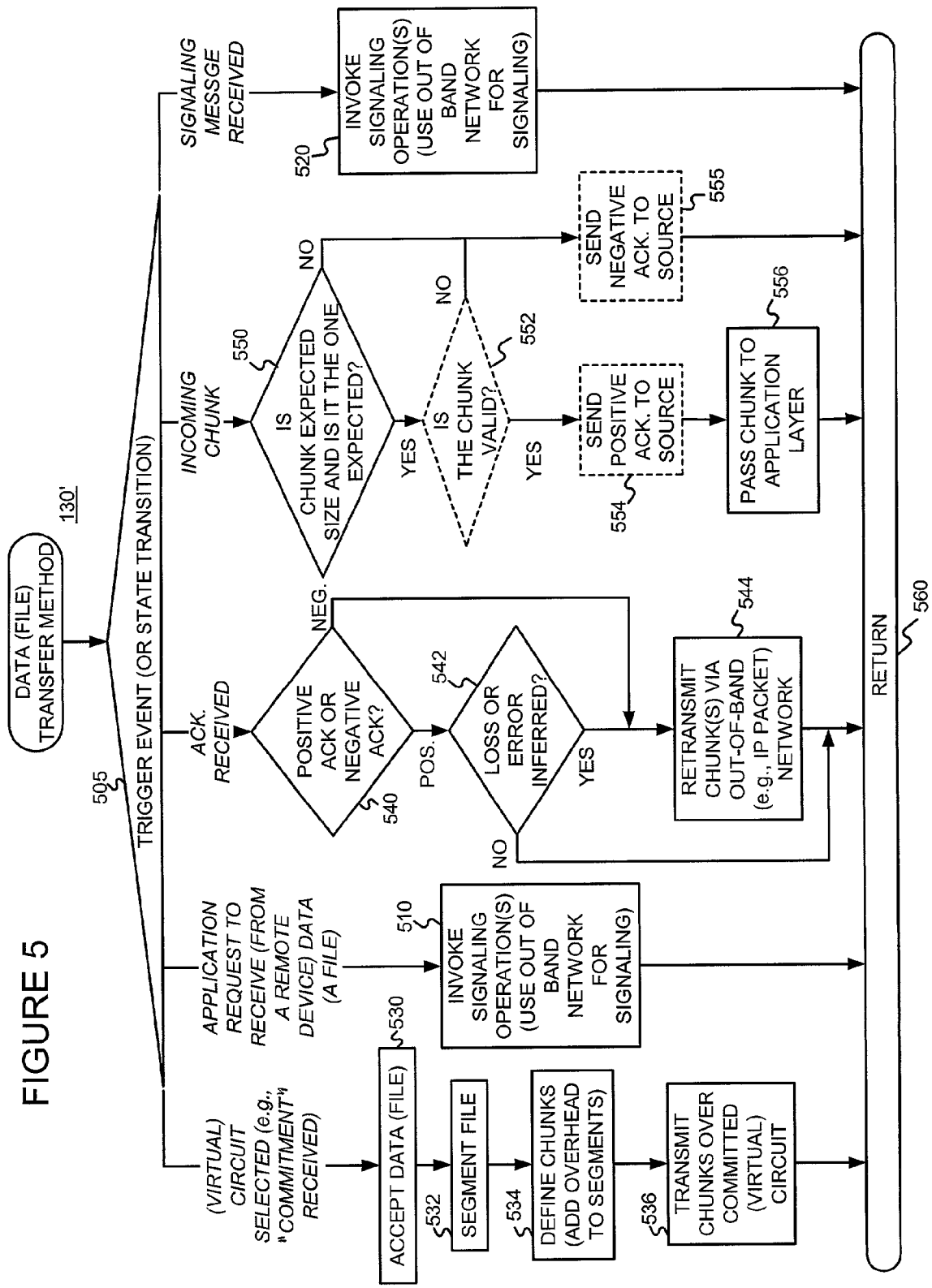
FIG. 5 is a flow diagram of an exemplary method that may be used to effect various data (file) transfer operations of the present invention.

Referring to FIG. 5, before data actually is transmitted (and preferably after a (virtual) circuit has been selected), the data (file) to be transferred is preferably accepted by the data transfer operation(s) as indicated by block 530 (See, e.g., FIG. 4A), segmented as indicated by block 532 (See, e.g., FIG. 4B), and overhead is added to these segments to define chunks indicated by block 534 (See, e.g., FIG. 4C).

Preferably, the destination data transfer operation(s) will be able to determine when it has received all chunks of a file, so that it can signal to the destination application that the file is complete and ready for access, and so that it knows when to send a "positive_acknowledgement" message to the source. The method for determining the end of the file depends on the method of segmentation. Various alternative segmentation techniques are possible.

In one embodiment, the source segments the padded payload into segments that are, with the exception of the last segment, a fixed length of S bytes. (See, e.g., FIG. 4B.) The source adds transmission sequence numbers to these segments to generate "chunks". (See, e.g., FIG. 4C.) The symbol C denotes the length of a chunk that carries a segment of S bytes. The last "payload_carrier" chunk of the transfer will be empty (except for its sequence number) if the length of the padded payload is an integer multiple of S $\exists n \in Z : P = nS$). Otherwise, the last "payload_carrier" chunk will contain the remainder of the payload that could not fit in the series of fixed-length segments. That is, if the payload is P bytes long, then the last chunk will carry $$4\left\lceil \frac{P-\lfloor \frac{P}{S} \rfloor S}{4} \right\rceil \text{bytes}$$

of payload.

The segment length (S) may be determined as follows. The source of the transfer will determine what segment length to use by accounting for the line error rate, transmission unit constraints as determined by signaling, as well as the degree of transport layer chunk overheads. The line error rate results in a range of preferred segment lengths. Message (transmission unit and receiving chunks) constraints may be indicated during (virtual) circuit setup. Transport layer chunk overheads include a 32-bit block sequence number, plus any optional fields such as ICVs and lengths. A realistic segment length might be 4 KB (to allow the segment and sequence number to fit in the 8 KB packets supported by Lucent Optistar NICs).

Since only the last chunk of the file will be shorter than C, the destination can determine when it has received the last chunk of the file. Note that the timeout mechanism described above ensures that even if the last chunk is lost, the transfer will eventually complete by either the source retransmitting the last chunk or by the destination aborting the transfer.

The last chunk of the transfer is followed by a "padding_length indication" message. The "padding_length_indication" message indicates the number of bytes of padding that were added to the file. The reason for indicating the amount of padding rather than the file length is that the amount of padding will be bounded to at most 4 bytes, whereas the file length need not be bounded. To describe such file lengths would require complicated variable-size coding. The "padding_length_indication" type is synonymous with the "payload_carrier" type. This eliminates any need to include a type indication in messages that flow over the (virtual) circuit, which in turn saves bandwidth and processing. A receiver knows that the message is of "padding_length_indication" by the fact that it was the second message that it received that was shorter than the segment length. The "padding_length_indication" message has a sequence number, as for payload messages. This is to protect against loss of the last chunk of the payload as follows. If the last chunk was lost, and the "padding_length_indication" message lacked a sequence number, then the "padding_length_indication" message might be interpreted as the last chunk of the payload, and so be presented as payload to the application. To prevent this from happening, the destination transport layer changes state when it receives the first message that is shorter than C, the maximal chunk length. It is likely that this message is the last chunk of the payload, but the destination does not deliver the information to the application until it has received another short message (which would be the "padding_length indication" message). If the destination times out when waiting for the second short message, then it will send a "positive_acknowledgement" to the source, requesting retransmission all information after the last full-length chunk received.

Three alternatives to this technique of generating chunks are now described. In a first alternative technique, the source indicates the file length to the destination during (virtual) circuit setup. The destination counts the volume of arriving information, and presumes that the transfer is complete when it has received a volume of information that matches the file length. Unfortunately, however, this first alternative technique requires the file length to be available at the start of the transfer (which is used for the network layer scheduling, but may limit the generality of the transport protocol). This length may require elaborate encoding so that it can increase without bound.

A second alternative technique employs a common method of framing in which each chunk indicates if more chunks are to follow. This approach is used in the segmentation of IP and AAL5, and AALs ¾ extend it to identify whether the cell is the beginning of, a continuation of, or the end of, a message. Unfortunately, with this second alternative framing technique, the type field has low entropy (in the information theory sense) and consequently wastes bandwidth (it usually set to indicate that there are more chunks). Not only does it waste bandwidth, but it also constitutes an unnecessary processing load in that the source must set its value, and the destination must check its value.

In a third alternative technique, framing may encapsulate an integrity check. This is the common technique when the framing is tied to decoding (e.g., when using byte stuffing), or when using a length field that has its own separate integrity check. Unfortunately, however, it does not consider the alternative of encapsulating the framing information within the integrity check value ("ICV"). For example, the framing could use a length indication, and receivers could align themselves with blocks by seeking bit patterns that reflect a valid ICV over a candidate block with length as indicated in the appropriate part of the block. This is a more complicated version of ATM's use of HEC for cell alignment.

The chunk length may be dimensioned based on the following. For retransmission-based error control, the source adds an Integrity Check Value (ICV) (e.g., cyclic redundancy codes, checksums, etc.) to each "transmission unit" (In this section, the generic term "transmission unit" is used to refer to the units of information that the source transmits. At the end of this section, it is shown that the transmission unit may need to be smaller than the file length, and so introduce segments and chunks which are the transmission units used.) so that the destination can verify its integrity. These ICVs and the volume of information that is retransmitted constitute the transmission overheads in retransmission-based error control. To analyze transmission efficiency, the following symbols are used:

U length of a transmission unit, containing payload and overhead, measured in bits. For the efficiency analysis, assume that all transmission units can be treated as having the same length. When the transmission unit is a segment of a file, this assumption will be reasonable for large files, since the segment will be much smaller than the file size, so the effect of any abbreviation of the final odd-sized segment on performance can be neglected.

H overhead per transmission unit (e.g. for ICVs), measured in bits. For the purposes of analysis, assume that the overhead is essentially independent of the transmission unit length. This is often true in practice where the fields are constrained to word lengths, but the ICV and sequence number fields could be influenced by the transmission unit length.

E probability that a bit will be received in error.

Strictly, only the probability that a transmission unit contains one or more errors is of interest. However, this tends to depend on the length of the transmission unit. A reasonable approximation for the probability that a transmission unit contains an error is EU. This comes from assuming that bit errors occur randomly (not in bursts), in which case the probability of a transmission unit having an error is $1-(1-E)^u$, which is approximately EU when E<<1, as is expected for the clean optical environment.

The average overhead for transmitting a transmission unit equals the overhead when transmitting it when there are no errors, plus the overhead when transmitting it when there are errors. Again, assuming that the probability of an error is small, this can be approximated by considering only single retransmissions (e.g. the probability that there is an error in a retransmission, and needs to be retransmitted itself, is negligible). In this case, the average transmission unit transmission overhead (as a fraction of the transmission unit length) is:

$$\frac{(1-EU)H + EU(H+U)}{U} = \frac{H+EU^2}{U}$$

This will be minimal when $$U = \sqrt{\frac{H}{E}}.$$

The range of values over which the transmission overhead is considered to be negligible, i.e. below some level N, can also be determined:

$$U = \frac{N \pm \sqrt{N^2 - 4EH}}{2E}$$

For example, if $E=10^{-9}$ (as is typical with fiber) and H=64 (e.g. a 32-bit CRC plus 32-bit sequence numbers), the overhead is minimal for a transmission unit of length 31 623 B, and is less than 1% over the range [800 B, 1.2 MB]. Since this range covers feasible transmission unit lengths (1500 B to 64 KB). Therefore, the transmission overhead from retransmission-based error control is negligible.

The transport protocol should not limit the length of payload that it can transmit. If it is to handle payload larger than 1.2 MB with negligible transmission overhead, then it may segment that payload into multiple transmission units (segments). The segments that carry the payload may be of fixed length, with the possible exception of the last segment which may carry remainders of the payload that do not fill a fixed-length segment. Fixing the length advantageously (i) helps the data transfer operation(s) to predict when the next chunk will arrive, (ii) facilitates the use of chunk sequence numbers, (iii) helps mark the end of the transfer, and (iv) is simple to implement.

Although the exemplary chunks described above included ICVs, note that for circuits, NIC ICV may be adequate so that transport ICVs are not needed. To calculate an ICV (either to generate it at the source, or to verify integrity at the destination) requires accessing every bit being communicated. This can constitute a significant load on memory access if it cannot be done at the same time that the information is accessed for other reasons (e.g., to move it into memory). Consequently, many NICs (e.g., Gigabit Ethernet and Optistar NICs) calculate ICVs on information as it arrives from the network into the NIC's buffer. Since the NIC provides an interface to the end-to-end circuit, the transport layer can use the NIC's ICV for "end-to-end" error checking. The only errors that cannot be detected by the NIC's ICV are those that occur at the terminals themselves. In practice, such errors can probably be neglected, just as a transport layer check does not protect against errors introduced by the transport or higher layers. (However, note that some argue that the application must check the information in any case, so transport layer checks may be unnecessary.)

In view of the foregoing, for circuit-switched networks, the NIC's ICV may have adequate end-to-end significance, and adding a transport layer ICV may unnecessarily impede performance. The NIC's ICV is often a CRC-32, which has adequate strength for the file transfer application. Therefore, the data transfer operations may rely on the NIC's ICV. If, however, the NIC doesn't provided ICV, the data transfer operation(s) should. For example, in one embodiment of the present invention, clients determine whether the NIC provides an ICV of the required strength, and the client will indicate (using the "transmission_icv_type" field of the request) what ICV the server should use (none if the NIC's ICV is adequate). In this embodiment, the data transfer operation(s) only adds an ICV of its own when the NIC's ICV is deemed inadequate. Note that the "transmission_icv_type" could also indicate that there is a file-wide ICV, in addition to chunk-wide ICVs. (This is in contrast with TCP, which always adds a checksum, independent of the degree of integrity offered by the network layer. TCP is simple because it does not have to adapt to the NIC being used, but this simplicity reduces performance when it unnecessarily calculates checksums.)

Although one embodiment of the invention relies on NIC ICV, there are at least four potential disadvantages of doing so. First, the transport layer cannot create a pseudo-header that contains information that is incorporated into the ICV calculations, but is not transmitted. For example, end-system addresses and the more significant bits of the sequence number could be treated this way. Second, using a NIC ICV limits the control that the transport layer has in selecting the ICV to use. For example, the NIC may only support CRC-32 while the transport desires a stronger check, such as the Secure Hash Algorithm ("SHA"). Third, the NIC is generally unaware of Application Layer Framing, and so cannot compute a file-wide integrity check. Such a check could assist with aspects of reliability other than integrity, such as detecting duplication, mis-sequencing, or omission of segments. Finally, NICs tend to "hide" the value of the ICV that they compute from the higher layers of the protocol stack (e.g. transport layer). The value of a frame-wide ICV might be useful to the transport layer so that it can build a hierarchy and compute an ICV over the complete file. That is, the NIC would compute ICVs of frames, and the transport layer could compute an ICV of the frame ICVs, and compare that to a value generated at the source. This method would avoid the need for the transport layer to touch each bit being communicated.

In practice, it is common for the NIC hardware to calculate an ICV, and to silently discard erroneous chunks without directly informing the transport layer. (The NICs usually maintain counters of the number of discarded frames for statistical purposes, and the upper layer could indirectly determine that a frame was lost by monitoring this statistic.) For example, this is true of the Optistar and Gigabit Ethernet NICs, which calculate a CRC-32. Thus, it is up to the transport layer to detect when the NIC has discarded a chunk, so that the transport layer can then initiate retransmissions. With isochronous (virtual) circuits and fixed-size chunks, the transport layer would expect to receive chunks periodically. It could detect that the NIC has discarded a chunk by the NIC not delivering a chunk in an expected time. That is, in theory, chunks do not need sequence numbers when they are transferred over isochronous (virtual) circuits. However, this may not be feasible in practice because the inter-arrival time between consecutive chunks may be smaller than what can be timed using software timers. For example, while Ethernet has been refined to operate with progressively increasing link rates, up to 1 Gb/s at present, and shortly 10 Gb/s, the versions of Ethernet have retained the same frame format for compatibility, limiting the size of Ethernet frames to 1500 B. With a line rate, R, of 1 Gb/s, the interval between consecutive transmission units of U=1500 B could be as low as 12 us. A transport protocol implemented in software would need to process chunks as they arrive, i.e. be interrupted every 12 us, and would have to be able to set a timer to expire between 12 us and 24 us after receipt of each packet. This accuracy may not be feasible in current software, where timers only have resolutions of milliseconds or more. Furthermore, even finer accuracy is needed for higher rates (e.g. 10 Gb/s Ethernet). Another way to detect when the NIC discards chunks is to assign each chunk a sequence number. The transport layer should then check the sequence numbers of incoming chunks, and will notice a discontinuity in the sequence numbers of received chunks when the NIC discards a chunk. An analysis of how large the sequence number field must be in order to detect bursts of discarded chunks is provided below.

Thus, in one embodiment, the transport layer operation(s) will associate with each chunk a "sequence_number". One embodiment of the present invention uses a 32-bit "sequence_number", starting with 1 for the first chunk of the file, and incrementing the "sequence_number" field by one for each subsequent chunk of the file, wrapping if necessary from $2^{32}-1$ to 0. (Note that the initial sequence number is 1, not 0 because, in one embodiment of the invention, at the beginning of a transfer, the value of 0 has a special meaning for positive acknowledgements.) Alternatively, initial sequence number negotiation can be provided to foster security and help improve relevance by filtering out chunks that have been falsely inserted into the stream.)

Referring once again to FIG. 4C, note that outer layers of encapsulation are optional, depending on the context in which the message is used. For example, messages that are transmitted over a packet-over-circuit interface (e.g. Ethernet or PPP) to the (virtual) circuit need not include framing information or an integrity check field since the packet interface provides those functions; whereas messages that are transmitted over a TCP connection generally need framing (e.g. a length field), but generally do not need an Integrity Check Value. The rationale behind the format is to locate fields that are usually required close to the payload so that the core of the format is constant.

§4.3.6 Bulk Transmission

Once the source determines the committed times (after transmitting the commit signal if the source was the client, or after receiving the commit signal if the source was the server), then it can commence the transfer over the (virtual) circuit at the committed start time. In one embodiment of the present invention, data transfer will continue using the parameters negotiated when the (virtual) circuit was initiated, until either the transfer is complete or an error occurs. Alternatively, transfer parameters may be permitted to be modified during a transfer (e.g. if available (virtual) circuit capacity increases, or if this transfer is preempted by another).

When transmission units have fixed size, and the transmission speed increases, the interval between consecutive transmission units being sent or arriving decreases. At the receiving terminal, if transmission units are handled individually, then this can increase the frequency with which a processor is interrupted, so high-speed communications may reduce the availability of the processor for other tasks. One embodiment of the present invention avoids this problem by "coalescing interrupts", in which case the processor is interrupted periodically or when a certain number of transmission units need processing. Data transfer operation(s) of the present invention may support such coalescing of interrupts through its chunk sequence numbers.

Circuits and virtual (virtual) circuits are usually released at the "end_time" specified in the commit signal. They may be released prematurely by any node issuing an "abort_transfer" message to the other nodes involved in the transfer. The transfer is deemed to be complete when the destination closes the connectionless (e.g., packet or TCP) network session. It will do this after it considers the transfer to be complete, as described below.

§4.3.7 Error Detection, Notification and Recovery

As introduced above, the present invention may function to ensure that the transfer of information from source to destination is "reliable". As discussed above, file transfers normally require high reliability. The present invention preferably uses retransmission-based error control to effect error recovery operation(s) 136. To implement that mechanism, the data may be provided with extra information (e.g., sequence numbers, ICVs) to facilitate error detection, errors are detected, the transmitting terminal is notified of any detected errors and the information is retransmitted. The present invention exploits the characteristics of optical circuits and file transfers by employing negative acknowledgements and retransmission on a parallel (e.g., connectionless, packet-switched) network. The reliable transfer of negative acknowledgements and retransmissions may be delegated to a known protocol, such as TCP, through which a connection over which this information is sent may be established. The factors that indicate the desirability of using retransmission error recovery are now introduced.

Circuit-switched networks are more "reliable" than packet-switched networks in that, by design, they will not re-sequence or duplicate information, and they are far less likely to deliver extraneous information to the destination (unlike in packet-switched networks, in which a packet from one session may incur a large delay so that it is received as part of a later session). Consequently, the present invention can focus on recovering from errors relating to integrity, completeness and delivery, making its error recovery simpler than that used in a transport protocol for packet-switched transfers. (The data transfer operation(s) of the present invention should not, itself, introduce other errors, e.g. re-sequencing.)

The data transfer operation(s) preferably uses retransmission-based error control, as opposed to Forward Error Correction ("FEC") schemes (e.g., Reed-Solomon error control). There are at least three reasons for this choice. First, the delay requirements of file transfers will tolerate the delays that can occur with retransmission-based error control. Second, retransmission-based error control has negligible transmission overhead for the conditions of interest. Finally, it is believed that retransmission-based error control is preferable when information must be transferred with high reliability (as for file transfers) over low error-rate links (such as optical circuits). With FEC error-control systems, when an error is found in a received word, the must be decoded, and the decoded word must be delivered to the user regardless of whether it is correct or incorrect. Since the probability of a decoding error is much greater than the probability of an undetected error, it is harder to achieve high system reliability with FEC schemes. In order to attain high reliability, a long, powerful error-correcting code must be used and a large collection of error patterns must be corrected. This makes decoding hard to implement and expensive.

The relative order of transmissions and retransmissions is now described. To reiterate, the source retransmits information in response to receiving a negative acknowledgement. In one embodiment, the source retransmits information in the order in which it receives "negative_acknowledgement" messages, and can retransmit information at any time after receiving a negative acknowledgement, provided it is confident that the retransmission will arrive at the destination before any timeout that would cause the destination to abort the transfer.

In practice, the source would retransmit information as soon as it can without interfering with its commitment to the rate of the original transmission process. By the source honoring its commitment to the transmission rate, it inherently protects the transfer from denial of service attacks. Note that retransmitting information may require fetching information from the disk in an order different from the order in which it is stored in the file, and so may reduce the rate at which the source can transmit information. This should be a non-issue for files stored on hard disks, since they are often fragmented across the disk in any case, but may be significant for files stored on read-only compact disks, or on tape. This should be taken into account when considering, for flow control purposes, the maximum rate at which the source can transmit. In an alternative scheme, the source may defer all retransmissions until after the entire file has been transmitted once. This scheme is possible because of the large sequence number space, which covers volumes of the order of terabytes (($2^{32}$=4 G)×1 KB=4 TB). Note that since retransmissions may be carried over a connectionless (e.g., TCP) network, the destination can exert flow control if it is ever not ready to receive them. Another alternative design would be to send the retransmissions with the transmissions over the (virtual) circuit, and send any transmissions that are in excess of the committed (virtual) circuit interval over the secondary (e.g., connectionless, packet-switched) network. This alternative technique is not preferred since it would complicate the receiver process (which could no longer expect to receive chunks with increasing sequence numbers), and would be susceptible to denial of service attacks.

Once a destination has determined that information has been lost, it may direct the source to retransmit that information (e.g., using negative acknowledgements). The source should then label the information that it retransmits in a manner that allows the destination to place it in the correct position with respect to correctly-received chunks. In this regard, in addition to be their use to allow the destination to detect chunk loss and to allow the destination to specify what is to be retransmitted, sequence numbers may also be added, by the source, to retransmissions so that the destination can position them properly. A different sequence number field could be used for each purpose (e.g., the sequence number space used to detect loss could be smaller than that used to specify what is to be retransmitted). However, in one embodiment of the present invention, the same sequence number field is used for each application. In an alternative embodiment, different sequence number fields could be used (which would further relax the urgency with which the source needs to retransmit information, as shown below).

In the following, sequence numbers will refer to chunks (rather than to bytes, as is the case with TCP's sequence numbers). This is because chunks are the atomic unit of payload information—in one embodiment, the data transfer operation(s) will not send a transmission unit that contains part of a chunk, or merged chunks. Further, since chunks will typically include multiple bytes of payload, numbering chunks rather than bytes allows more information to be sent before the sequence number space wraps, allowing a larger bandwidth-delay product for a given sequence number field size.

In one embodiment of the present invention, 32-bit sequence numbers are used. One reason for choosing this size is that sequence numbers that are integer multiples of 32-bits in size can be readily aligned on 32b word boundaries in signaling messages, facilitating speedy implementation. The following factors may also affect how large sequence numbers should be. First, the length of the largest burst of lost chunks that must be detected may affect the size of the sequence number field. Second, the size of the sequence number fields may be selected to reduce the frequency of software interruptions. For example, sequence number of s bits allows the destination to deal with groups of $2^s$ chunks at a time. This may be important for software implementations, since it would increase the period between interrupts to $2^s$U/R. For example, with s=32, U=1 KB, R=10 Gb/s, a receiver would only need to check for discontinuities in the sequence number space every $2^{32}$ 0.1 KB/$10^{10}$=3518 seconds, which is almost an hour. Third, the ability to determine whether or not a file is complete with high confidence may affect the size of the sequence number field. Recall, for example, that one embodiment of the present invention does not count chunks or bytes in order to determine when a file has been completely received, but waits for a chunk that indicates the end of the file. This is intended to allow the file transfer operation(s) to transfer files that are arbitrarily long. If a burst of chunks that spans a complete sequence number space is lost, then the file transfer operation(s) will be unable to detect that loss, interfering with its ability to be able to ensure the completeness aspect of reliable transfer. (Alternative versions may provide for a file-wide integrity check that could detect such large losses.) Thus, using a large sequence number space minimizes the probability that the file transfer operation(s) will deliver an incomplete file (without detection) to the application. With a 32-bit sequence number space, the probability of a group of $2^{32}$ consecutive chunks being lost is exceedingly small (and for typical link rates and transmission unit sizes, a timeout would occur before this many chunks could be lost), so any incomplete transfers should be detectable. Fourth, the sequence number space should be large enough so that the sequence numbers do not wrap in the time it takes for an acknowledgement to reach the source, or in the time that it takes for a retransmission to reach the destination. If this were not so, then the acknowledgement or retransmission might be ambiguous to the recipient. Fifth, the possible ambiguity of retransmissions can be solved by ensuring that the retransmission order matches the order in which the destination sent negative acknowledgements, and this in turn can be ensured by the reliable transport protocol (TCP). Thus, it does not matter how long retransmissions take to arrive at the destination. This is important in allowing the source to schedule retransmissions whenever it wants.

The possibility of ambiguous acknowledgements may limit the speed of (virtual) circuits that A data transfer technique of the present invention can support. The source must receive an acknowledgement in time so that it can be sure that it knows which chunk it corresponds to. If the packet-switched network (that carries acknowledgements from the destination to the source) exhibits a delay variation of V seconds, then the source should not transmit more than $2^s$ chunks in V seconds (where s is the sequence number size, in bits). It seems reasonable to assume that V should be less than 400 ms, since 400 ms is considered to be the maximum one-way delay tolerable for voice (The actual delay for a circuit-switched network may be much less, since circuit-switched networks tend to have little internal buffering, so most of the delays are propagation delays.), and voice service is available globally, so voice-quality connections should be possible from the destination to the source. This means that the source should transmit at no more than $2^{32}/0.4$ chunks/second. Even with a small chunk size of 1 KB, this equates to a transmission rate in excess of 8 Tb/s. If this were to become a limitation, then a new acknowledgement type could be introduced that used a larger sequence number. Thus, a 32b sequence_number field seems sufficient.

For a source to participate in retransmission-based error control, it must be able to determine what information needs to be retransmitted. There are two techniques for allowing the source to determine this. First, with a polling technique, the source polls the destination for its state, and then provides the necessary retransmissions. Second, with an Automatic Repeat Request ("ARQ"), the destination automatically (without prompting by the source) requests any necessary retransmissions. Polling has the disadvantage for the common case that the source must still poll the destination in order to determine that it doesn't have to retransmit anything. This polling constitutes an overhead, which is not always necessary for ARQ. Consequently, a preferred embodiment of the present invention uses ARQ to allow the source to determine what (chunks) need to be retransmitted.

Automatic Repeat Request ("ARQ") can use positive acknowledgements (which indicate explicitly what has been received, and imply what needs retransmitting), or negative acknowledgements (which indicate explicitly what needs to be retransmitted, and therefore imply what has been received). Most protocols have been designed for packet-switched networks, and have used positive acknowledgements. (Exceptional packet-switched protocols that use negative acknowledgements include SSCOP, which is not affected by the mis-ordering issue, and reliable multicast protocols where negative acknowledgements can alleviate acknowledgement implosion problems.) Positive acknowledgements have been popular because negative acknowledgements have two disadvantages for packet-switched networks—namely packet loss and packet mis-ordering. First, regarding packet loss, packet-switched networks can suffer from congestion, which can cause loss. Negative acknowledgements constitute additional traffic that must flow across the network, so the policy of issuing negative acknowledgements when information is lost may only serve to exacerbate congestion and loss. Second, regarding packet mis-ordering, many packet-switched networks can mis-order packets, and sources generally retain information until they are confident that it need no longer be retransmitted. Using negative acknowledgements increases the size of these retransmission buffers. This is because with positive acknowledgements, most information is released a round-trip time after it was sent, whereas with negative acknowledgements information can only be released after a timeout, which is set to more than the round-trip time, and indicates that a negative acknowledgement is unlikely to arrive. Since packet loss and mis-ordering are not issues that arise when using negative acknowledgements in connection-oriented (circuit-switched) networks, the use of negative acknowledgements with the present invention is not precluded.

Positive acknowledgements also provide two services that negative acknowledgements cannot provide—namely maintaining connection/soft state and explicitly acknowledging the final packet (or frame or chunk). First, regarding maintaining connection/soft-state, since storage for state information is a scarce resource, protocols are designed to age the state information, and to terminate a connection if it is idle for excessively long. Positive acknowledgements provide "heartbeats" that indicate that the destination is still lively (at least at the transport layer), and that it is worthwhile for the source to continue with the transfer. Similarly, they indicate to intermediate systems (e.g. firewalls and proxies) that they should retain state information associated with the connection. Second, regarding providing an explicit acknowledgement for final chunk, recall that two distinct aspects of reliable transfer are completeness and delivery. The destination uses the retransmissions and acknowledgements discussed in previous sections to ensure that it receives the complete file. However, the source may also be interested in determining whether the delivery was successful. The source cannot determine this by the absence of negative acknowledgements, since that can also be caused by the destination failing. Positive acknowledgements may be used if the source needs to receive an indication of the ultimate successful delivery of the payload to the destination. Yet such positive acknowledgements are only needed at the end of the transfer, and are not necessary during the transfer. Such positive acknowledgements are also unnecessary when the destination is pulling information (as opposed to the source pushing information), since then only the destination is truly concerned about the successful delivery. In most transfers, the destination pulls bulk information, and most of the chunks of this bulk information will not be the final chunk of the transfer (which might require a positive acknowledgement). Because one embodiment of the present invention has been optimized for simplicity and speed for the common case, the need for a positive acknowledgement for the final chunk of some transfers is not a compelling reason for it to use positive acknowledgements. If the present invention desires to provide the source with a delivery indication without using positive acknowledgements, the destination may send the source a positive acknowledgement at the end of the transfer. It may do so by sending a "positive_acknowledgement" message immediately after determining that it has received all chunks of the file.

As can be appreciated from the foregoing discussion, data transfer operation(s) of the present invention preferably uses negative acknowledgements for error control, mainly for simplification. For the common case in which retransmissions are not needed, negative acknowledgements will impose no load on the signaling network, whereas positive acknowledgements would load the signaling network. (Strictly, the load of the positive acknowledgements can be reduced to arbitrarily low levels by reducing the frequency with which they are sent, e.g. in response to every other received segment, although this will delay the acknowledgements and increase the required size of the source's retransmission buffer.) Also, positive acknowledgements may be considered to not constitute an additional load if they have a use other than error control (i.e., if they perform double (or more) duty, such as, as heartbeats for maintaining a connection). Alternatively, or in addition, the present invention may provide positive acknowledgements. Such positive acknowledgements allow a source that maintains a retransmission buffer, to provide a serial API, to drain that buffer. Such positive acknowledgements may also be used for maintaining connections, as just alluded to.

In one embodiment of the present invention, the "negative_acknowledgement" message contains the sequence number of a chunk that the destination considers to have been lost, effectively asking the source to retransmit this chunk.

For example, the server could send a "negative_acknowledgement" message in response to receiving a chunk whose sequence number is not one larger than that of its predecessor (taking into account sequence number wrapping). Moreover, it is possible for a chunk to be lost and for it to have no successor, which would normally stimulate the transmission of a negative acknowledgement. For example, a series of chunks at the end of the file may be lost. To be able to account for such a case, the destination should employ a timer. During normal operation, the timer would have a period of "TIMER_SHORT", indicating the expected maximum interval over which the destination might fail to receive any information when the source is still transmitting. For example, if errors occur rarely and are uniformly distributed over time, then the "TIMER_SHORT" parameter could be as short as the transmission time of a couple of chunks. Every time that the period "TIMER_SHORT" expires, the destination would check that it has received at least one chunk since the timer started. If the destination has received a chunk, then it will reset the timer. If the destination has not received a chunk, then it will send a "positive_acknowledgement" to the source. The "positive_acknowledgement" usually indicates the sequence number of the last chunk successfully received, except if the destination has not yet received any chunks from the source then the positive acknowledgement will have a sequence number of 0. When the destination sends a "positive_acknowledgement", it will set the timer to a duration "TIMER_LONG". If the destination receives a chunk before the timer expires again (TIMER_LONG), then it should reset the timer to "TIMER_SHORT", and continue as per normal. If it does not receive a chunk before "TIMER_LONG", then it should abort the transfer by sending an "abort_transfer (TIMER_LONG_EXPIRED)" message to the source, and closing the signaling (e.g., TCP) session. When the source receives a positive acknowledgement for a chunk that is not the last chunk of the file, then it should retransmit all chunks that follow the positive acknowledged chunk in the file. The source would effectively have "TIMER_LONG" after receiving a positive acknowledgement to ensure that another chunk arrives at the destination before the transfer is aborted.

In one embodiment, "TIMER_SHORT" is set to a period greater than the expected inter-arrival time between chunks. Chunks that are still propagating to the destination while the positive acknowledgement propagates to the source will be retransmitted, even if they would have arrived at the destination intact. Thus, "TIMER_SHORT" should be set to a period larger than the round-trip propagation delay between source and destination, in order to minimize the performance degradation of such retransmissions. Lower values of "TIMER_SHORT" may result in the destination sending positive acknowledgement messages when the source already intends to send more information (e.g. if several chunks in the midst of the file were lost due to bit errors), while larger values of "TIMER_SHORT" reduce the responsiveness of the protocol to node failures. A destination can make the value of "TIMER_SHORT" larger than the minimum so as to reduce the frequency with which it is to check for received chunks (e.g. to reduce the frequency of software interrupts). The "TIMER_LONG" parameter should be set to at least the round-trip propagation delay between source and destination. Again, longer values of "TIMER_LONG" reduce the responsiveness of the protocol to node failures, whereas shorter values may result in the transfer being unnecessarily aborted. The recommended values for the timers are 800 ms for "TIMER_SHORT" and 5 minutes for "TIMER_LONG". Since most connection-based protocols already include a timeout mechanism to prevent indefinite retention of state information for connections that have failed, the timer mechanism described above could be provided without adding further overhead on the destination.

An out-of-band (e.g., packet-switched) network preferably carries acknowledgements and retransmissions. Although the goal of the transport protocol is to unidirectionally deliver information across a (virtual) circuit from source to destination, control (e.g., signaling) information (e.g. acknowledgements) may need to be sent the opposite direction. It is desirable to avoid establishing a (high capacity) (virtual) circuit for this control information, since (i) its rate is should be very low, and many (virtual) circuits are only available in multiples of a high base rate (e.g. 51.84 Mb/s for SONET), and (ii) its occurrence is very bursty, which doesn't match the isochronous nature of (virtual) circuits.

Moreover, it is desirable to be able to send retransmissions on a channel other than the (virtual) circuit for at least two reasons. First, if retransmissions were sent on the (virtual) circuit, then the (virtual) circuit must be held open after the completion of the initial transmission, until the source receives an acknowledgement indicating that all information arrived properly. In the common case, in which no retransmissions are required after the final transmission, this will leave the (virtual) circuit idle for a period of at least the round-trip propagation delay. It would be more efficient if the (virtual) circuit could be closed immediately after the final transmission, and that any retransmissions could be sent on an alternate channel. Second for data (file) transfers over (virtual) circuits, recall that it is desirable that the holding time for the unidirectional (virtual) circuit be known before the transfer to facilitate scheduling of transfers. Yet the number of retransmissions that will be required will not be known until after the transmission has completed. Consequently, it is desirable to also send retransmissions on a channel separate from the unidirectional (virtual) circuit.

This separate channel may be a packet-switched network that operates in parallel with the circuit-switched network to send control information for the transport protocol, as well as retransmissions. For example, retransmission could be sent over the same out-of-band (packet-switched) network that is needed to control the circuit-switched network. By selecting an appropriately short chunk length (as discussed above), the volume of control information and retransmissions should be limited so that it does not unduly load the signaling channel. An alternative design would be to send all information (transmissions and retransmissions) on the (virtual) circuit until the (virtual) circuit was closed. Any further sending would be done across the packet-switched network. A disadvantage of this approach would be the need to distinguish between transmissions and retransmissions on the (virtual) circuit; although this approach might be better if the (virtual) circuit holding time can be extended so all transmissions and most retransmissions can be done on the fast (virtual) circuit, with the only information that needs to be sent on the packet-switched network being that sent after the (virtual) circuit is closed, and this approach might be better suited to the hybrid transmission mode described below.

Most transport protocols need not only deal with unreliable delivery of the initial transmission of payload information from source to destination, but also with unreliable delivery of the retransmissions and control information. The data (file) transfer operation(s) of the present invention can avoid responsibility for this by using transport layer operation(s) (e.g., TCP) to carry the information that it sends over the packet-switched network. This is justified because TCP is already designed to provide reliable transfer over packet-switched networks such as the signaling network. Furthermore, the low volume of information (signaling and chunk retransmission) expected to send over this network should be able to tolerate the relatively slow software that is needed to implement a sophisticated, yet complicated, protocol such as TCP. Thus, the preferred embodiment of the present invention is optimized for the common case to use simple mechanisms that can be implemented at high-speed, and to use slower but more sophisticated software for rare cases (such as errors on optical (virtual) circuits).

When transferring a file, it is often necessary or desirable to transfer information other than just the content of the file. For example, the name and attributes of the file may need to be conveyed, and a client may want to list files that are available on a server in order to select the ones of interest. Some applications, such as the file transfer protocol ("FTP"), may open a separate transport layer session to carry this other information. Other applications may require that this information be transmitted over the same transport session as is used for transmitting the content of the file. One embodiment of the present invention will transmit such short units of information over the packet-switched network. It will not provide any guarantee of the relative order of short and long units of information.

§4.3.7 Security Issues

A transport protocol such as the data (file) transfer operation(s) of the present invention should be able to provide security; at least for its own information. The data (file) transfer operation(s) may also provide security for information which it is treating as payload.

By using negative acknowledgements, an (denial of service) attacker could merely send a stream of negative acknowledgements to the source, and if the source served retransmissions before transmissions, then it could spend all of its time needlessly repeating information. The fact that the source application commits to transmitting payload (excluding retransmissions) at a certain rate limits this potential problem. This problem could be avoided altogether by requiring that the source only retransmit information slowly when it is still transmitting the file for the first time (e.g. deferring any retransmissions until after the initial transmission is complete), and by authenticating the negative acknowledgements. The data transfer operation(s) of the present invention may supports authentication of negative acknowledgements through the negotiation, during transfer initiation, of the type of control ICV that is used, as described above. In contrast, it is more difficult to deny service when positive acknowledgements are used. This is because with positive acknowledgements, an attacker has to suppress the flow of positive acknowledgements from destination to source, and since these flow over arbitrary paths across the packet-switched network, the attacker may need to suppress the flow of information across multiple points in the network, which will likely be more difficult than generating traffic from a single point.

"Cryptographic modes" describe how bits of the file are processed when they are encrypted and/or de-crypted for secrecy, and processed to ensure authenticity. Using terminology from the Data Encryption Standard ("DES"), common encryption modes are Electronic Codebook ("ECB"), Cipher Block Chaining ("CBC"), Output Feedback ("OFB") and Cipher Feedback ("CFB") modes. With the CBC and CFB modes, which are most often used, decryption of one chunk of the file requires prior decryption of all prior chunks of the file, so decrypted chunks become available serially, rather than the out-of-order delivery that may be provided by the present invention (in order to avoid re-sequencing buffers at the destination). Accordingly, if the present invention is to use encryption, such encryption should be done using a mode similar to the Output Feedback mode of DES in which received bits can be decrypted independently. Similarly it should be possible to independently authenticate individual chunks.

Non-sequential delivery of information to the user can complicate the calculation of file-wide integrity checks, e.g. MD5. Conventionally, these process each byte of the file in sequence, and culminate with an integrity check for the entire file. When segments can be stored to disk in arbitrary order, it may be necessary to calculate the MD5 of each segment, creating a "segment-level MD5", and then to calculate the MD5 of the segment MD5s, creating a "file-level MD5". To ensure that segments have not been mis-ordered, it may be necessary to include the segment number in the calculation of the segment-level MD5s. (Note also that in order to decrypt a file when segments arrive out of sequence, it will be necessary to re-initialize the decryption process with each segment, or to operate the ciphers in Output Feedback Mode.) Note that for cryptographic devices to keep up with the speed of optical links, they may use algorithms that offer parallelism, such as tree ciphers. If the unit of parallelism can be matched to the chunk size, then these algorithms will be readily able to accommodate the out-of-order delivery.

One embodiment of the present invention provides for periodic "positive_acknowledgements" to ensure that firewalls do not terminate idle connections that carry control messages.

§4.4 Conclusions

Thus, the data transfer techniques of the present invention can be thought of as transport protocols designed to support file transfers from a source to a destination over a circuit or virtual circuit (e.g., a lightpath over optical fiber).

A data transfer technique of the present invention may use rate-based mechanisms, that reflect the fixed rate of optical circuits, to provide the functions of flow control between peer applications and congestion avoidance. Rate-based control allows full utilization of the lightpath (as opposed to TCP's Slow Start), and allows the sequence numbers to identify chunks rather than bytes, relaxing the urgency with which sequence numbers need be recycled, and allowing communication over high bandwidth-delay product channels.

Data transfer techniques of the present invention may exploit the fact that many types of files must be complete before any part can be used, and that files are stored (e.g., on disk) at the endpoints. Consequently, retransmission buffers at the source and re-sequencing buffers at the destination can be avoided by asking the application to: retrieve information from disk when needed for retransmission; and to store information to disk as it arrives (possibly with holes, which will be filled by retransmissions). This is in contrast to stream-oriented transport protocols, such as TCP, which provide a serial interface to the application, and consequently hasten retransmissions to release storage in the limited-size retransmission and re-sequencing buffers. With the data transfer techniques of the present invention, the destination can issue a negative acknowledgement when it detects that information needs to be retransmitted (a simple process given that (virtual) circuits preserve sequence), and the source can retransmit the information much later.

Retransmitting payload information over the packet-switched network is justifiable because the low error rate of optical circuits should make retransmissions rare and so impose an insignificant load on the packet-switched network. Packet-switched retransmissions advantageously allow sources to efficiently close the (virtual) circuit immediately after transmitting the last bit of the file for the first time. If sources were to retransmit over the (virtual) circuit, then they would need to hold the (virtual) circuit open and idle until receiving acknowledgements for all bits in the transfer, which could not occur until at least a round-trip time after the last bit of the file was transmitted (and might take much longer due to the tolerances required on timers that control timeouts). Second, packet-switched retransmissions advantageously permit the (virtual) circuit holding time to be constrained, helping network-layer scheduling. That is, since the number of chunk retransmissions that a file transfer will require depends on the error rate experienced during the transfer, if (virtual) circuit retransmissions were to be used, this could elongate the (virtual) circuit holding time beyond that scheduled before the transfer began.

Reliability is of concern not just for the initial transmissions, but also for the acknowledgements and retransmissions sent over the packet-switched network. Thus, the present invention may communicate over the packet-switched network through a connection provided by an existing transport protocol, such as TCP. This simplifies A data transfer technique of the present invention, allowing initial transmissions, which constitute the bulk of the transfer, to zip across the fast lightpath, and relatively rare acknowledgements and retransmissions to pass slowly, but reliably, across the packet-switched network.

A data transfer technique of the present invention also addresses the denial of service attacks made possible by the choice of negative acknowledgements, and the impact of out-of-order access to storage on encryption modes.

A data transfer technique of the present invention allows the application to specify a deadline (deadline) by which the file should be transferred, and a non-zero probability that the deadline can be exceeded (late_prob). The latter is useful because A data transfer technique of the present invention cannot predict how many retransmissions a transfer will require because of channel errors, and so can only make a probabilistic guarantee that a file will be transferred by a certain deadline. As an application decreases its specification of the probability with which the deadline can be exceeded, it reduces the probability that A data transfer technique of the present invention will be able to schedule and start the transfer.

The fact that file transfers are insensitive to delay allows A data transfer technique of the present invention to use retransmissions for error control, and to postpone retransmissions.

What is claimed is:

1. A method for transferring a data file from a first terminal to a second terminal over a selected circuit or a virtual circuit, the method comprising:
   segmenting the data file to define data segments;
   adding overhead to each of the data segments to define chunks;
   transmitting substantially all of the chunks comprising the data file, from the first terminal to the second terminal, over the selected circuit or virtual circuit;
   checking, at the second terminal, whether or not each of the chunks is valid and whether each expected chunk was received;
   if it is determined at the second terminal that one of the chunks is either invalid, or not received, then sending from the first terminal, over a communications channel of a different type than the selected circuit or virtual circuit using a protocol different from the protocol of the selected circuit or virtual circuit the chunk determined to be invalid, or not received,
   wherein sending from the first terminal, over a communications channel of a different type than the selected circuit or virtual circuit using a protocol different from the protocol of the selected circuit or virtual circuit the chunk determined to be invalid, or not received without retransmitting the chunk over the selected circuit or virtual circuit.

2. The method of claim 1 wherein each of the chunks has the same size.

3. The method of claim 1 wherein the overhead includes a sequence number.

4. The method of claim 1 wherein the overhead includes a first field for carrying a value indicating a length of the chunk, and wherein the first field precedes the data segment in the chunk.

5. The method of claim 1 wherein the communications channel has a bandwidth that is less than that of the selected circuit or virtual circuit.

6. The method of claim 1 wherein the communications channel supports reliable transmissions.

7. The method of claim 1 wherein the communications channel is packet-switched.

8. The method of claim 1 wherein the selected circuit or virtual circuit is an isosynchronous circuit.

9. The method of claim 1 wherein the selected circuit or virtual circuit delivers data in sequence.

10. A method for transferring a data file from a first terminal to a second terminal over a selected circuit or a virtual circuit, the method comprising:
    segmenting the data file to define data segments;
    adding overhead to each of the data segments to define chunks;
    transmitting the chunks, from the first terminal to the second terminal, over the selected circuit or virtual circuit;
    receiving at the first terminal, over a communications channel other than the selected circuit or virtual circuit, a positive acknowledgment message from the second terminal indicating that the second terminal determined that a chunk was valid; and
    retransmitting the chunk over a communications channel other than the selected circuit or virtual circuit using a protocol different from the protocol of the selected circuit or virtual circuit in the case that a positive acknowledgement message is not received.

11. The method of claim 10 comprising sending an error indication message wherein the communications channel for the error indication message and retransmissions are the same communications channel.

12. The method of claim 10 wherein the communications channels are a single packet-switched connection.

13. The method of claim 10 wherein the communications channels for receiving the positive acknowledgement messages and retransmissions are the same communications channel.

14. The method of claim 10 wherein the communications channels are a single packet-switched connection.

15. The method of claim 10 wherein the act of determining that a positive acknowledgement message is not received comprises an act of determining that a predetermined amount of time has passed without receiving a positive acknowledgement message.

16. A data transfer facility comprising:
    means for negotiating, with another terminal, a circuit or a virtual circuit for a data transfer;

means for accepting chunks of data from the other terminal via the negotiated circuit or virtual circuit;

means for determining;

for each of the chunks, whether the chunk has any errors, and whether an expected chunk was not received;

means for indicating to the other terminal, via a communications channel, that a chunk has errors or was not received; and means for accepting, over a communications channel, retransmitted chunks from the other terminal, wherein the communications channels are different than the circuit or virtual circuit and wherein the protocol used in the communications channel to retransmit the chunks is different from the protocol used to transmit the chunks over the virtual circuit.

17. The data transfer facility of claim 16 wherein the communications channels are the same communications channel.

18. The data transfer facility of claim 16 wherein each of the communications channels are packet-switched.

19. The data transfer facility of claim 16 wherein the communications channels have a lower bandwidth than that of the circuit or virtual circuit.

20. The data transfer of claim 16 further comprising:

non-volatile storage means; and means for writing to the non-volatile storage means, the data segments in the received chunks that are determined not to have any errors.

21. For use in a terminal, a data transfer facility comprising:

a processor;

memory coupled to said processor having stored therein instructions, that in response to execution by the processor cause the data transfer facility to:

negotiate over a communications channel, with an other terminal, a circuit or virtual circuit for a data transfer of a set of data;

add overhead to data segments to define chunks of the set of data; and transmit substantially all of the chunks of the set of data to the other terminal over the circuit or virtual circuit; and retransmit over a communications channel other than the circuit or virtual circuit a selected chunk of data from the set of data after determining that the selected chunk of data was not received by the other terminal or was received with an error, wherein the communications channel is of a different type than the circuit or virtual circuit and wherein the communications protocol used over the communications channel is different than the communications protocol of the circuit or virtual circuit, wherein the transmit of substantially all of the chunks of the data set from the terminal to the other terminal over the selected circuit or virtual circuit comprises continued transmit of remaining chunks of the data file over the selected circuit or virtual circuit without regard to errors in any one of the chunks received at the second terminal.

22. The data transfer facility of claim 21 wherein the communications channel is packet-switched.

23. The data transfer facility of claim 21 wherein the communications channel has a lower bandwidth than that of the circuit or virtual circuit.

24. The data transfer facility of claim 21 wherein the memory comprises instructions that in response to execution by the processor processes an explicit error message from the other terminal.

25. The data transfer facility of claim 21 wherein the memory comprises instructions that in response to execution by the processor determine an error from the absence of a positive acknowledge message from the other terminal.

26. The data transfer facility of claim 21 further comprising:

non-volatile storage for storing data segments, wherein the memory comprises instructions that in response to execution by the processor extract a data segment included in the chunk to be retransmitted from the non-volatile storage.

\* \* \* \* \*

UNITED STATES PATENT AND TRADEMARK OFFICE
CERTIFICATE OF CORRECTION

| | | |
|---|---|---|
| PATENT NO. | : 7,965,729 B2 | Page 1 of 1 |
| APPLICATION NO. | : 10/155832 | |
| DATED | : June 21, 2011 | |
| INVENTOR(S) | : Veeraraghavan et al. | |

It is certified that error appears in the above-identified patent and that said Letters Patent is hereby corrected as shown below:

Column 47, line 25, in Claim 20, delete "transfer of" and insert -- transfer facility of --.

Column 48, line 32, in Claim 25, delete "acknowledge" and insert -- acknowledgement --.

Signed and Sealed this

Eleventh Day of October, 2011

David J. Kappos
*Director of the United States Patent and Trademark Office*